(12) United States Patent
Nair et al.

(10) Patent No.: US 6,219,452 B1
(45) Date of Patent: Apr. 17, 2001

(54) PATTERN MATCHING SYSTEM AND METHOD WHICH PERFORMS LOCAL STABILITY ANALYSIS FOR IMPROVED EFFICIENCY

(75) Inventors: Dinesh Nair, Austin; Lothar Wenzel, Round Rock; Nicolas Vazquez; Samson DeKey, both of Austin, all of TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/227,506

(22) Filed: Jan. 6, 1999

(51) Int. Cl.$^7$ .................................................. G06K 9/64
(52) U.S. Cl. ................................................ 382/217
(58) Field of Search ................................... 382/217, 218, 382/219, 220, 221, 161, 177, 215, 216, 209, 210; 707/516, 523, 526, 527, 541

(56) References Cited

U.S. PATENT DOCUMENTS

| | | | |
|---|---|---|---|
| 5,594,809 | * | 1/1997 | Kopec et al. .................. 382/161 |
| 5,652,804 | * | 7/1997 | Bronstein et al. ............... 382/141 |
| 5,940,810 | * | 8/1999 | Traub et al. ..................... 705/36 |
| 6,058,377 | * | 5/2000 | Traub et al. ..................... 705/36 |

OTHER PUBLICATIONS

"Numerical Recipes in Fortran 77: The Art of Scientific Computing" (ISBN 0–521–43064–X) pp. 299–306, Coyright 1986–1992.

William H. Press, Sal A. Teukolsky, William T. Vetterling and Brian P. Flannery, "Numerical Recipes in C, The Art of Scientific Computing", Second Edition, 1992, Cambridge University Press, pp. 309–314.

"Monte Carlo Extension of Quasin–Monte Carlo", Art B. Owen, Dept. of Statistics, Stanford University, 1998, 7 pages.

"Faster Evaluation of Multidimensional Intergrals", A.. Papageorgiou and J. F. Traub, Dept. of Computer Science, Columbia University, NY, Jun. 1997, pp. 1–9.

"Scrambling Sobol and Niederreiter–Xing Points", Art B. Owen, Stanford University, Dec. 1997, pp. 1–25.

"Quasi–Random Sequences and Their Discrepancies" William J. Morokoff and Russel E. Caflisch, Mathematics Department, UCLA, Jul. 21, 1994, pp. 1–44.

* cited by examiner

Primary Examiner—Andrew W. Johns
Assistant Examiner—Seyed Azarian
(74) Attorney, Agent, or Firm—Conley, Rose & Tayon PC; Jeffrey C. Hood

(57) ABSTRACT

A system and method for performing pattern matching to locate zero or more instances of a template image in a target image. The method first comprises sampling the template image using a Low Discrepancy sequence, also referred to as a quasi-random sequence, to determine a plurality of sample pixels in the template image which accurately characterize the template image. The Low Discrepancy sequence is designed to produce sample points which maximally avoid each other. After the template image is sampled or characterized, the method then performs pattern matching using the sample pixels and the target image to determine zero or more locations of the template image in the target image. The method may also perform a local stability analysis around at least a subset of the sample pixels to determine a lesser third number of sample pixels which have a desired degree of stability, and then perform pattern matching using the third plurality of sample pixels. In one embodiment, the local stability analysis determines a plurality of sets of sample pixels with differing stability neighborhood sizes, and the pattern matching performs a plurality of iterations of pattern matching using different sets of sample pixels, preferably performed in a coarse to fine manner, e.g., using sets of sample pixels with successively smaller stability neighborhood sizes and/or step sizes. The present invention also includes performing rotation invariant pattern matching by sampling the template image along one or more rotationally invariant paths, preferably circular perimeters, to produce one or more sets of sample pixels. These sample pixels from the circular paths are then used in the pattern matching. The rotationally invariant pattern matching may also use local stability analysis and coarse to fine searching techniques.

65 Claims, 15 Drawing Sheets

PRIOR ART PATTERN MATCHING

PRIOR ART PATTERN MATCHING WITH
CHARACTERIZATION OF THE TEMPLATE IMAGE

1 x 1 Pixel Step Size

9 x 9 Pixel Step Size

5 x 5 Pixel Step Size

PATTERN MATCHING SYSTEM AND METHOD WHICH PERFORMS LOCAL STABILITY ANALYSIS FOR IMPROVED EFFICIENCY

FIELD OF THE INVENTION

The present invention relates to improved methods for performing pattern matching to locate one or more instances of a template image in a target image, wherein the invention includes an efficient method for characterizing the template image, improved methods for performing the pattern matching, and improved methods for locating rotated and/or scaled images.

DESCRIPTION OF THE RELATED ART

In many applications it is necessary or desired to find a template image or image object in a larger target image. Such applications include machine vision applications including process monitoring, feedback control, and laboratory automation; image and video compression; and jitter compensation in video cameras, among others.

Prior art pattern recognition systems have typically used a template matching technique wherein the stored image or pattern to be located, referred to as the template, is iteratively compared with various corresponding portions of an image in which it is desired to locate the template, referred to as the target image. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm generally operates to compare the pixels in the template image, or a selected subset of sample pixels, against each of the possible various locations in the target image. Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching produces the location of the template in the image, the quality of match and possibly the orientation, size and/or scaling of the template.

The template is compared with portions of the target image typically utilizing a correlation based pattern matching, i.e., using normalized two dimensional correlation (normalized 2D correlation). This 2D correlation is performed by placing the template over the respective portion of the image and performing a complete normalized 2D correlation between the pixels in the template and the pixels in the corresponding portion of the image. This correlation generally produces a correlation value which indicates the degree of correlation or match. For example, the correlation value may range between $-1$ and $+1$, wherein $+1$ indicates a complete match, 0 indicates no match, i.e., that the two images are uncorrelated, and $-1$ indicates that the two images are anti-correlated, i.e., a complete reversal of a match.

The normalized 2D correlation operation is based on a point-wise multiplication wherein the template is first placed over a portion of the image, each point or pixel of the template is multiplied with the corresponding pixel in the respective portion of the image, and the result is summed over the entire template. Also, as noted above, the template image is generally compared with each possible portion of the target image in an iterative fashion. This correlation-based pattern matching technique is thus very computationally intensive.

Various optimizations or algorithms have been developed to provide a more efficient correlation-based pattern matching. One prior art technique is to use selected samples or pixels from the template image, referred to as sample pixels, to represent the template image and hence to reduce the number of computations in the correlation.

FIG. 2 illustrates the pattern matching process of the prior art which involves characterization of the template with a reduced number of sample pixels. In this process, a characterization of the template is performed to extract features from the template image. In other words, the template is characterized to represent the template image with a lesser number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

Prior art techniques for characterizing the template image have utilized a homogeneous sampling of the template, such as a grid-based sampling of the template, Another prior art technique is to utilize random points or pixels within the template image and to use these random sample pixels in the correlation-based pattern matching. However, each of the above prior art techniques operates to select a subset of the pixels in the template image which do not necessarily best represent or characterize the template image. In other words, homogeneous sampling or random sampling of the template image does not produce the optimum subset of samples or pixels which best represent the template image.

Therefore, an improved system and method is desired for correlation based pattern matching. More particularly, an improved system and method is desired for characterizing or selecting samples or pixels from a template image which best represent the template image with the fewest samples possible.

In addition, an improved system and method is also desired which reduces the number of correlation operations which are required in a pattern matching operation. Further, improved techniques are desired for performing pattern matching for rotated images, translated images and images which have changed in size.

SUMMARY OF THE INVENTION

The present invention comprises a system and method for performing pattern matching to locate zero or more instances of a template image in a target image. The pattern matching is preferably performed in a computer system. The template image is received and/or stored in the computer system and comprises a first plurality of pixels. The target image is preferably acquired by the system, such as by a camera and provided to the computer system for the pattern matching.

According to a first embodiment, the method and system first comprises sampling the template image using a Low Discrepancy sequence, also referred to as a quasi-random sequence, to determine a plurality of sample pixels in the template image which characterize the template image. The Low Discrepancy sequence is designed to produce sample points which maximizes the distance between sample points. Also, the Low Discrepancy sequence sampling results in fewer points and/or a better characterization of the template image than a random sequence sampling or a uniform sampling. Examples of the Low Discrepancy sequence include Halton, Sobol, Faure, and Niederreiter sequences. The sampling or characterization of the template image is preferably performed off-line prior to receipt of a target image. Thus the sampling or characterization of the template image is preferably not constrained by real time requirements.

After the template image is sampled or characterized, the method then performs pattern matching using the sample pixels and the target image to determine zero or more locations of the template image in the target image.

According to a second embodiment, the method and system comprises sampling the template image, wherein the template image comprises a first plurality of pixels, and wherein the sampling produces a second lesser number of sample pixels. This sampling may use any of various sampling techniques, including a Low Discrepancy sequence as described above.

The method then performs a local stability analysis around at least a subset of the sample pixels to determine a lesser third number of sample pixels which have a desired degree of stability. The local stability analysis operates to ensure stability of each of the subset of sample pixels to spatial perturbations around the sample pixel. For each pixel, the local stability analysis preferably comprises finding a neighborhood around the sample pixel where the value of the sample pixel correlates highly with the template image pixel values in the neighborhood. The local stability analysis is preferably performed for all of the sample pixels. The method then performs a pattern matching using the third plurality of sample pixels and the target image to determine zero or more locations of the template image in the target image.

In one embodiment, the local stability analysis determines a plurality of sets of sample pixels with differing stability neighborhood sizes, and the pattern matching comprises performing a plurality of iterations of pattern matching using different sets of sample pixels. The iterations are preferably performed in a coarse to fine manner, e.g., using sets of sample pixels with successively smaller stability neighborhood sizes. These plurality of iterations of pattern matching may also use different step sizes for each of the different sets of sample pixels, wherein the step size preferably corresponds with the stability neighborhood size. Thus the plurality of iterations of pattern matching in the coarse to fine manner preferably uses sets of sample pixels with successively smaller stability neighborhood sizes and/or successively smaller step sizes. For example, a first iteration of pattern matching may determine one or more candidate locations in the target image which possibly include the template image, and one or more second iterations of pattern matching are performed at the determined one or more candidate locations in the target image, and so on.

In a third embodiment, the present invention comprises a system and method for performing pattern matching to locate one or more instances of a rotated or scaled template image in a target image. The method comprises first sampling the template image along one or more rotationally invariant paths, preferably circular perimeters, to produce one or more sets of sample pixels. The method then comprises performing pattern matching using a cyclic correlation between each of the one or more sets of sample pixels and the target image to determine zero or more locations of the template image in the target image. This pattern matching detects rotated versions of the template image in the target image.

In one embodiment, the method includes performing a local stability analysis around at least a subset of the sample pixels. The method then performs pattern matching uses one or more sets of sample pixels along one or more circular perimeters based on the local stability analysis. The local stability analysis preferably determines a plurality of sets of sample pixels with differing stability neighborhood sizes. In this case, the pattern matching comprises performing a plurality of iterations of pattern matching using different sets of sample pixels, preferably in a coarse to fine manner, e.g., using sets of sample pixels from circular paths with successively smaller stability neighborhood sizes. The pattern matching may also use different step sizes for each of the different sets of sample pixels. As discussed above, a first iteration of pattern matching may determine one or more candidate locations and corresponding rotation values in the target image which possibly include the template image, and one or more second iterations of pattern matching are performed at the determined one or more candidate locations in the target image using the respective rotation values, and so on. A final pattern matching may utilize substantially all of the template image pixels at the respective candidate locations and using the determined rotation values.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The present invention comprises a system and method for performing pattern matching. The pattern matching system and method of the present invention may be used in a number of different applications including various types of machine vision systems, e.g., industrial automation, robotic vision, or traffic analysis, and image or video compression, such as MPEG compression, among others.

The present invention also comprises a system and method for representing an image with a reduced number of sample pixels. This system and method for representing an image using a reduced number of sample pixels may also be used in a large number of different applications, such as pattern matching, image compression, video compression, archival of image data, etc.

Figure 1:
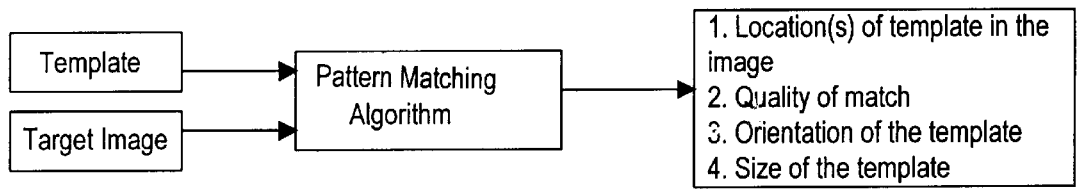
FIG. 1 illustrates the pattern matching as performed in the prior art.
Figure 2:
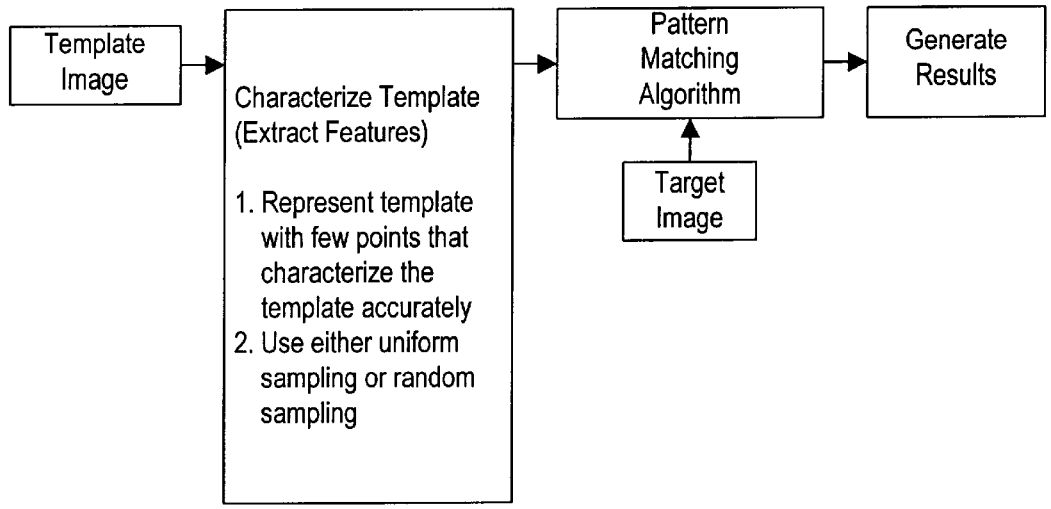
FIG. 2 illustrates pattern matching performed in the prior art which includes characterization of the template image with fewer pixels for reduced computation.
Figure 3:
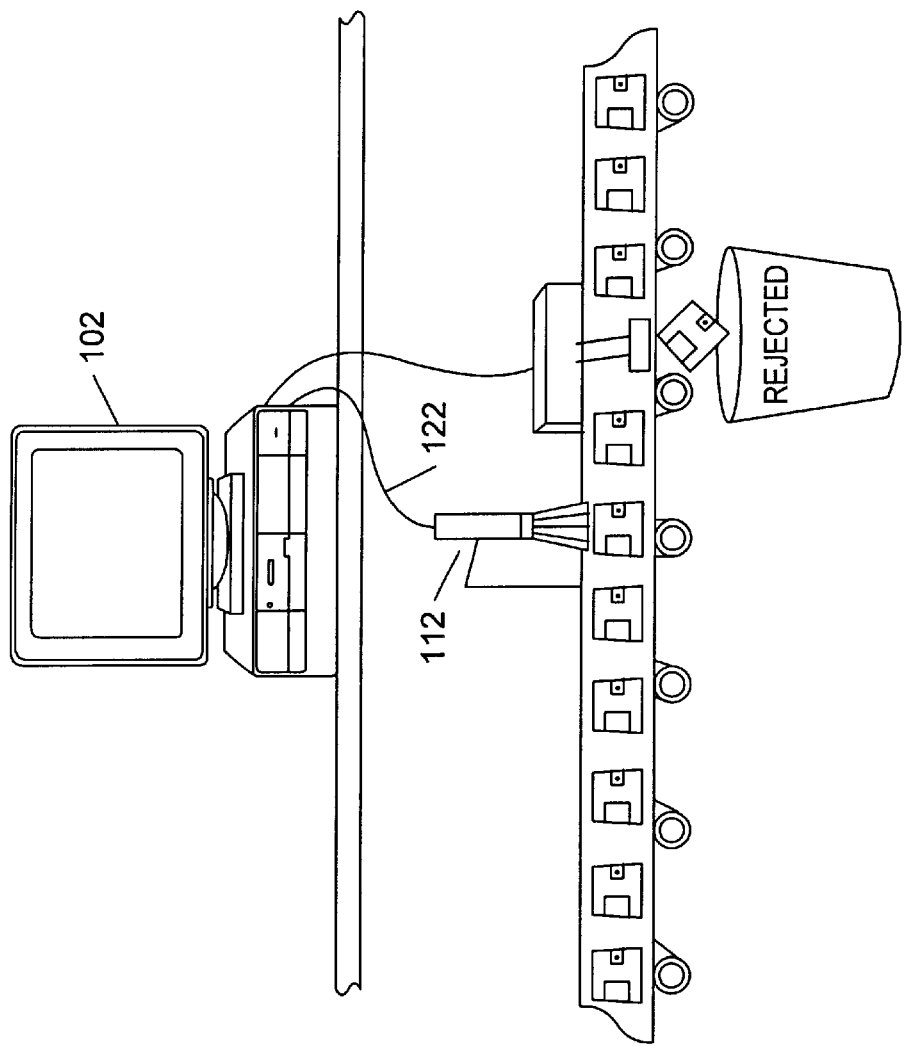
FIG. 3 illustrates a machine vision system according to one embodiment of the present invention.

FIG. 3—Machine Vision System

FIG. 3 illustrates an example of a machine vision application wherein the pattern matching system and method of the present invention may be used. The machine vision system comprises a host computer 102 and a video source 112. The video source 112 preferably produces a digital video signal which comprises an image or a sequence of images or video frames, or other data desired to be acquired. The digital video signal is provided through a wire or cabling 122 to the host computer 102 for storage and/or processing. The host computer 102 includes various standard components, such as at least one CPU, memory, etc.

The host computer 102 stores a template image or pattern. According to the present invention, the host computer 102 also stores software which performs pattern matching to locate zero or more instances of the template image in the target image. According to the present invention, the software is executable to sample the template image to generate sample pixels which best represent or characterize the template image, and to use these sample pixels in the pattern matching operation.

In the embodiment of FIG. 3, the host computer 102 receives the target image from the video source 112 and performs pattern matching using sample pixels generated from the stored template image. However, in other embodiments, the computer 102 may receive the target image and/or the template image from another source, or one or both of the target image and the template image may be pre-stored on the computer.

FIG. 3 illustrates a machine vision application, wherein the computer system 102 is coupled to a camera 112 and operates to receive a target image and perform pattern matching to locate one or more instances of a template image in the target image. The computer system of FIG. 3 is programmed according to the present invention to represent the template image with a reduced number of sample pixels and/or to perform the improved pattern matching methods of the present invention. The pattern matching and/or image characterization techniques of the present invention may be used in various types of machine vision applications. For example, the computer 102 may be embodied in various form factors and/or architectures, e.g., a robot, among others. It is also noted that the pattern matching and/or image characterization techniques of the present invention may be performed in any of various manners, either in software, programmable logic, or hardware, or a combination thereof.

Figure 4:
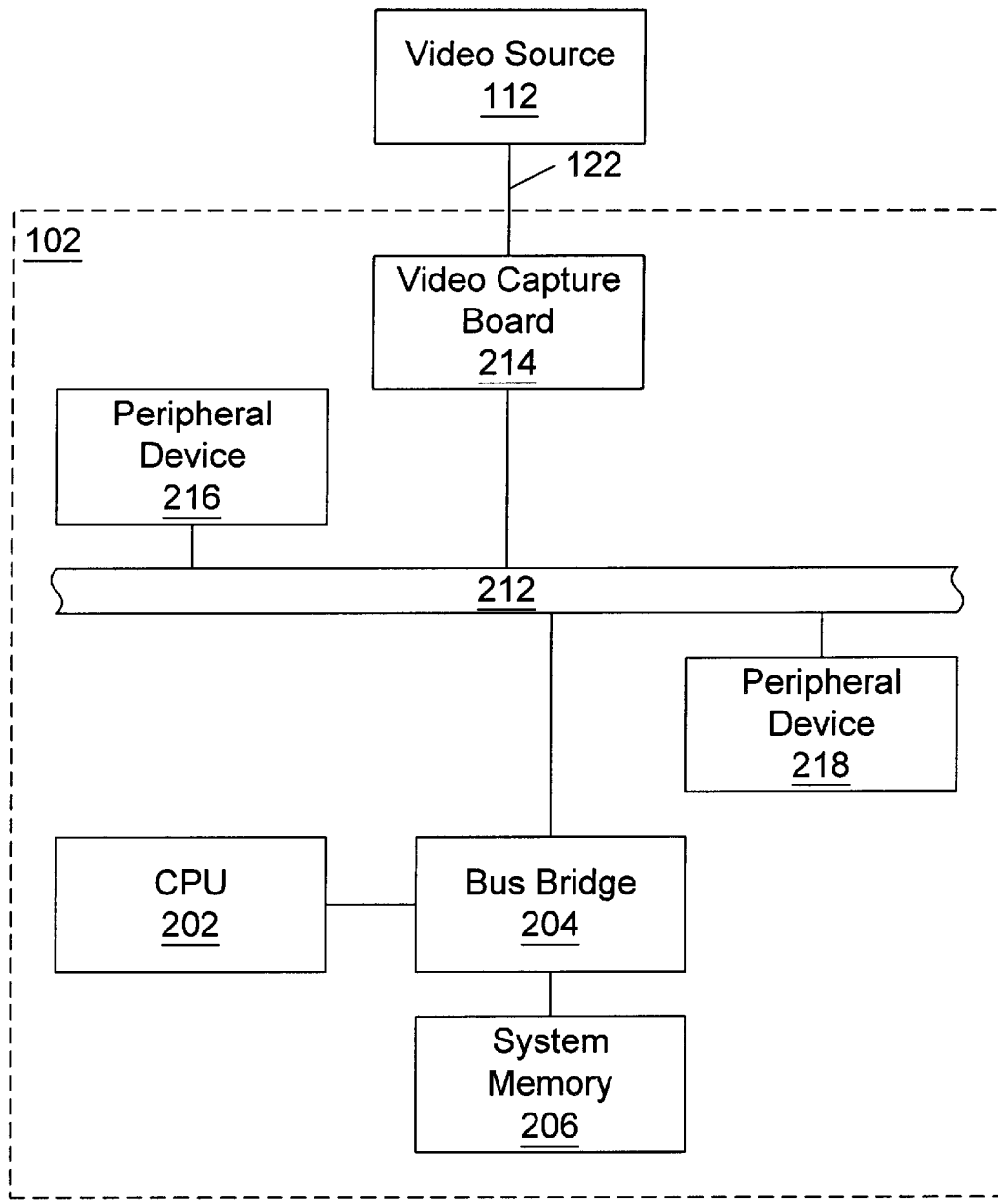
FIG. 4 is a high-level block diagram of the machine vision system.

FIG. 4—Video Capture System Block Diagram

FIG. 4 is a high-level block diagram of the video capture system of FIG. 3. It is noted that the block diagram of FIG. 4 is exemplary only, and other computer system architectures may be used as desired. For example, the present invention may be implemented in a "smart camera", for example, which integrates a sensor, analog to digital (A/D) converter, CPU and communications devices together in a single unit. The present invention may be embodied in other architectures or embodiments, as desired.

As shown in FIG. 4, the host computer 102 preferably comprises a CPU 202, a Bus Bridge 204, system memory 206, and a peripheral bus 212. The CPU 202 is coupled to the Bus Bridge 204. The Bus Bridge 204 is coupled to the system memory 206 and the CPU 202, and couples to the peripheral bus 212. In the preferred embodiment, the peripheral bus 212 is the PCI expansion bus, although that other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the digital video signals to the video capture board 214. The video capture board 214 transfers the digitized video frames to the system memory 206 through peripheral bus 212 and Bus Bridge 204. In this embodiment, the video capture board 214 acquires the target image and transfers the target image to system memory 206.

The system memory 206 preferably stores a template image or pattern. The system memory 206 also preferably stores software according to the present invention which operates to characterize the template image with a reduced number of samples. The software samples the template image using a Low Discrepancy sequence, such as a Halton sequence or Sobol sequence. The sampling of the template image using a Low Discrepancy sequence according to the present invention is discussed further below. The system memory 206 also preferably stores software according to the present invention which performs pattern matching using the sample pixels with improved efficiency.

The present invention is preferably implemented in one or more software programs which are executable by a processor or CPU. The software program(s) of the present invention are preferably stored in a memory medium. As used herein, the term "memory medium" is intended to include an installation media, e.g., a CD-ROM, DVD, or floppy disks, a computer system memory such as DRAM, SRAM, EDO RAM, etc., or a non-volatile memory such as a magnetic medium, e.g., a hard drive, or optical storage, among other types of memory.

Figure 5:
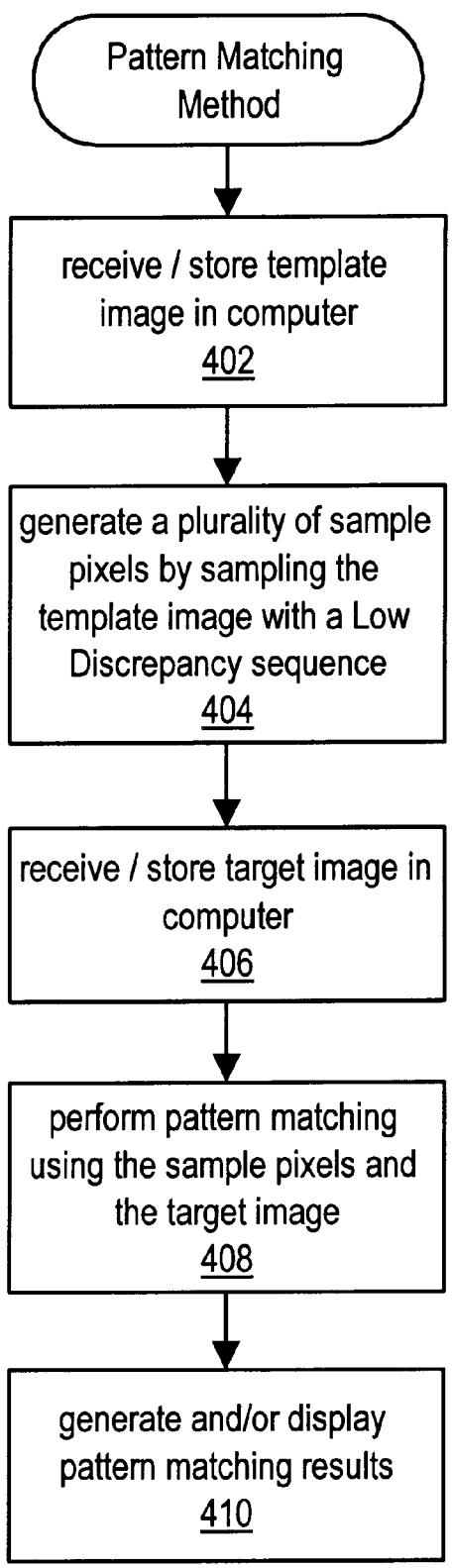
FIG. 5 is a flowchart diagram illustrating the pattern matching method of the present invention, including sampling of the template image with a Low Discrepancy sequence.

FIG. 5—Pattern Matching Flowchart

FIG. 5 is a flowchart diagram illustrating a method for performing pattern matching according to the present invention.

As shown, in step 402 the template image is received by or stored in the computer system. The template image may be received from any of various sources, as desired. The template image preferably comprises a first plurality of pixels.

In step 404 the template image is characterized or sampled to represent the template image with a lesser number of pixels or samples which accurately characterize the template image. According to the preferred embodiment of the invention, the pixels comprising the template image are sampled using a Low Discrepancy sequence. Low Discrepancy sequences comprise mathematical sequences that are efficient samples of high dimensional spaces. A Low Discrepancy sequence is also referred to as a quasi-random sequence or a sub-random sequence. The Low Discrepancy sequence is designed to produce sample points which maximally avoid each other, i.e., is designed to produce sample pixels which best represent the image. Examples of Low Discrepancy sequences include the Halton sequence, the Sobol sequence, the Faure sequence and the Niederreiter sequence, wherein differences between these are minor from a real world applications point of view. Sampling the template image using a Low Discrepancy sequences results in much fewer sample pixels to characterize the template image and/or a better characterization of the template image than would a random sampling technique or a uniform sampling technique.

The following is an example of the operation of a Low Discrepancy sequence (Halton set).

First, at step 1 the method selects the type of Low Discrepancy sequence, e.g., Halton, 2d (2-dimensional). In general, mathematicians are interested in nd applications of low-discrepancy sets where n>10, sometimes n>100. However, for a 2-dimensional image, a 2d sequence is used.

At step 2 the method then selects a criteria for construction of the Halton set, for example, construction in the unit square [0,1]×[0,1], it being noted that the general case can be derived by a scaling operation.

At step 3 the method then selects two prime numbers p and q. It is very common to use p=2 and q=3, although this is not necessary. Every pair of (p,q) results in a slightly different Halton set, wherein all of these sets are equivalent.

The variables $(x_n, y_n)$ denote the nth element of the Halton set. Given n, at step 4 the method notates n in the p-ary system (in the case where p=2 it is the well-known binary system). The result is $n = a_k, \ldots a_1, a_0$ where the a's are 0 or 1 in case of the binary system, but 0, 1, . . . , p−1 in the general case.

At step 5, the method then reverses the order of $a_k, \ldots a_1, a_0$. This results in $a_0, a_1, \ldots, a_k$.

At step 6 the method then adds the (n-ary) point, i.e. $0.a_k \ldots a_1 a_0$. This number is in between 0 and 1 and represents the x-component of the nth Halton point (xn,yn).

At step 7 the method repeats steps (4)–(6) based on the other number system q. This produces the y-component.

After steps 1–7, the nth point of the Halton sequence has been constructed.

The following is an example of the construction of a Low Discrepancy sequence in 2d. Here it is assumed that p=2 and q=3. This example determines the 10th element, i.e., $(x_{10}, y_{10})$.

The method starts with the x-component as follows:

(4') 10=1010 (decimal=binary) because 10=1*8+0*4+1*2+0*1

(5') reverse the order→0101

(6') add the point→x10=0.0101 (0.0101 can be translated into $0*(\frac{1}{2})+1*(\frac{1}{4})+0*(\frac{1}{8})+1*(\frac{1}{16})=\frac{1}{4}+\frac{1}{16}=\frac{5}{16}$ Now the y-component is computed as follows:

(4") 10=101 (decimal=ternary) because 10=1*9+0*3+1*1

(5") reverse the order→101

(6") add the point→y10=0.101 (0.101 can be translated into $1*(\frac{1}{3})+0*(\frac{1}{9})+1*(\frac{1}{27})=\frac{10}{27}$ For more information on Low Discrepancy sequences, please see "Numerical Recipes in Fortran 77: The Art of Scientific Computing" (ISBN 0-521-43064-X) Cambridge University Press, pgs. 299–306, which is hereby incorporated by reference as though fully and completely set forth herein.

In step 406 the target image is received and/or stored in the computer system. In the embodiment of FIG. 3, the target image is received from the camera 112. However, as noted above, the target image may be received from any of various sources, as desired. The target image is usually significantly larger than the template image.

In step 408 pattern matching is performed using the sample pixels generated in step 404 to find zero or more instances of the template image in the target image. In the preferred embodiment, the sample pixels determined in step 404 are iteratively compared with selected portions of the target image, preferably using a 2D correlation technique, to find matches and hence to determine instances or locations of the template image in the target image. The pattern matching may use a computed step size to step across the image and/or use a coarse to fine search method for improved efficiency.

In many applications, it is necessary or desired to perform the pattern matching in real time when the target image is acquired. In machine vision applications, "real time" often refers to "video real time", i.e., to performing the function for every single image acquired by the camera, e.g., for a NTSC camera that acquires 30 frames/second. For example, in the machine vision embodiment shown in FIG. 3, the pattern matching is preferably performed in real time when the target image is acquired by the camera 112. However, in these real time embodiments, the template image is typically pre-stored in the computer 102, and there is generally a large amount of time in which to characterize or process the template image to produce the sample pixels. Once the sample pixels have been generated, the system can perform the pattern matching method a plurality of times for a plurality of acquired target images, preferably in real time.

In step 410 the pattern matching results are generated, preferably providing an indication of the locations of the template image in the target image. The pattern matching method may also provide information on the orientation(s) of the template image, the size of the template, and other information.

The Low Discrepancy sequence used for sampling the template image according to the present invention optimally samples the template image to determine a plurality of sample pixels which best represent the template image with the fewest number of pixels.

Figure 6:
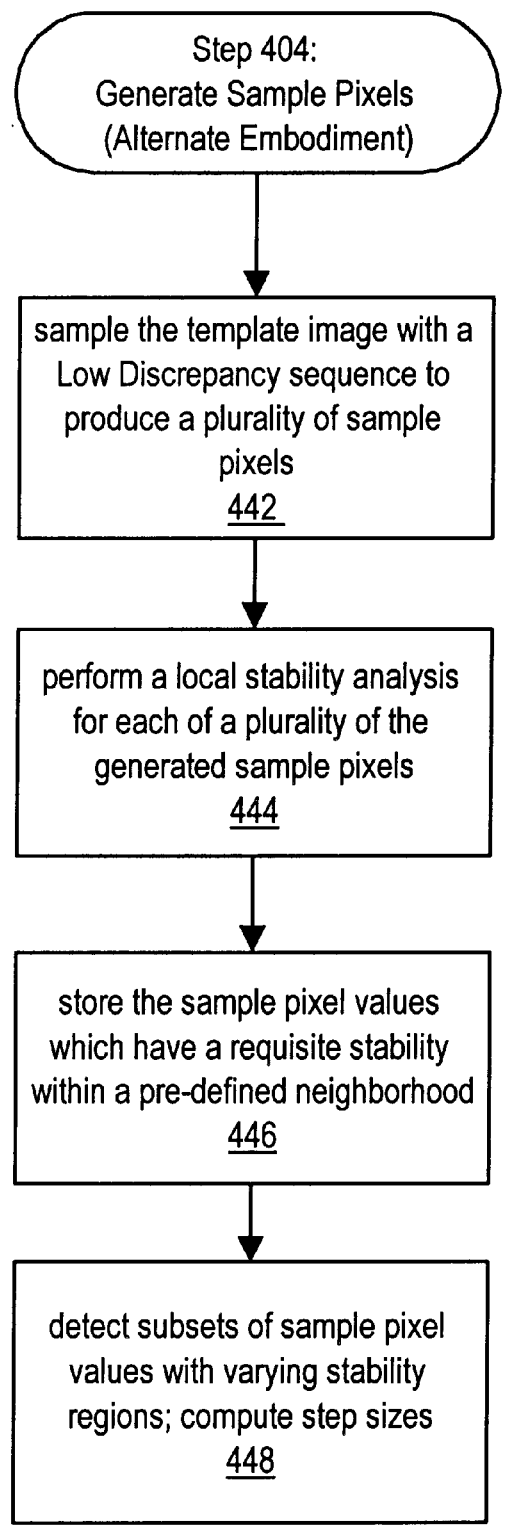
FIG. 6 is a flowchart diagram illustrating the generation of sample pixels using local stability analysis according to the preferred embodiment.

FIG. 6—Sampling of the Template Image

FIG. 6 is a flowchart diagram illustrating an alternate embodiment of the template characterization or representation performed in step 404 of FIG. 5. The flowchart of FIG. 6 thus illustrates an alternative method for representing an image, such as a template image, with a reduced number of sample pixels which accurately characterize the image.

As shown, in step 442 the image is sampled to produce a plurality of sample pixels which represent the image. In this embodiment, the template image may be sampled using any of various sampling techniques, such as a uniform sampling technique, i.e., a uniform grid based sampling, a random sampling sequence, or using Low Discrepancy sequences such as the Halton or Sobol sequence as described with respect to step 404 of FIG. 5. In the preferred embodiment, a Low Discrepancy sequence is used to sample the image because the Low Discrepancy sequence produces the fewest sample pixels or points which accurately characterize the image.

After the sampling of the image has been performed to produce a plurality of sample pixels, in step 444 a local stability analysis is performed for at least a subset of and preferably for all of the generated sample pixels to determine stability of the respective sample pixels to spatial perturbations. For each candidate sample pixel value for which this local analysis is performed, the method operates to determine a neighborhood around the respective candidate sample pixel where the template image pixel values comprised in the neighborhood correlate highly with the candidate sample pixel value. In other words, for each candidate sample pixel value for which the local stability analysis is performed, a correlation is performed with neighboring pixel values within the template image to determine if the candidate sample pixel value is stable within its neighborhood, i.e., the neighboring pixel values have similar or correlated values with the respective candidate sample pixel value.

In step 446 the method optionally operates to save only those candidate sample pixel values which have a requisite stability within a predetermined or predefined neighborhood size. Sample pixel values generated in step 442 which are not stable within the pre-defined neighborhood are preferably thrown out or not used. Thus, this method operates to further reduce the number of sample pixel values used in the pattern matching operation. Stated another way, the method shown in FIG. 6 operates to represent an image, such as a template image used in pattern matching, with an even further reduced number of sample pixel points.

In one embodiment of the invention, described below with respect to FIG. 7, after either of steps 444 or 446, in step 448 the method further operates to find or detect different respective stability regions or neighborhood sizes for which each of the respective subset or all of the sample pixel values are stable, according to a stability criteria or varying stability levels. Stated another way, the method operates to detect and categorize subsets of sample pixel values with varying stability regions, i.e., operates to categorize subsets of sample pixel values according to stability region size.

The different stability region sizes are also preferably used to determine a step size for stepping the respective sample pixels across the target image in the pattern matching process. This step size is used during the pattern matching operation to reduce the number of correlations required to be performed in the pattern matching. Thus, for a set of sample pixel values which have a larger stability neighborhood size, the set of sample pixel values can be stepped across the target image during the iterative correlation process with a larger step size. A set of sample pixel values with a smaller stability neighborhood size are stepped across the target image during the iterative correlation process with a correspondingly smaller step size.

As described below with respect to FIG. 7, in the subsequent pattern matching process, the sample pixel values having different stability neighborhood sizes are then used in a coarse to fine search, preferably using the respective computed step sizes. Thus the method operates to determine different stability neighborhood sizes and corresponding step sizes for use in a coarse to fine pattern matching search.

As described above, in machine vision applications, generally a large or infinite amount of time is available for characterizing the template image. In contrast, when the target image is obtained, it is generally desirable for the pattern matching to occur as quickly as possible. Therefore, a relatively large amount of processing may be performed to characterize or represent the template image, including sampling the template image using Low Discrepancy sequences, local stability analysis for each of the sample pixel values and computation of desired step sizes. This pre-processing is not required to be performed in real time. Rather this pre-processing of the template image is performed to enable a faster pattern matching computation when the target image is acquired.

Figure 7:
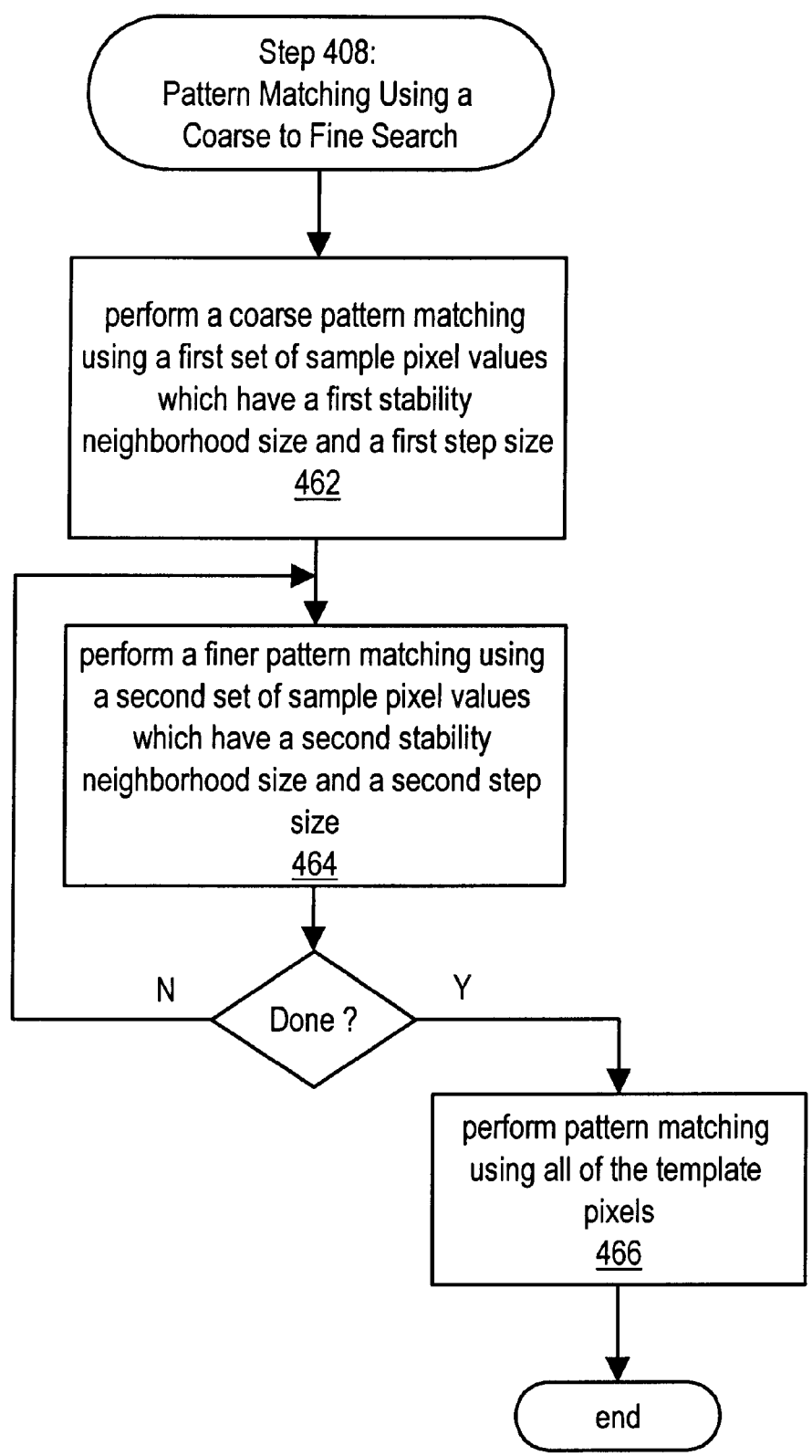
FIG. 7 is a flowchart diagram illustrating the pattern matching method using a coarse to fine search according to the preferred embodiment.

FIG. 7—Pattern Matching Using Computed Step Sizes and Coarse to Fine Searching FIG. 7 is a flowchart diagram illustrating the pattern matching process performed in step 408 of FIG. 5 according to the preferred embodiment of the present invention. The flowchart of FIG. 7 illustrates pattern matching using different stability neighborhood sizes and corresponding step sizes in a coarse to fine search. Steps which are similar or identical with those in FIGS. 5 and 6 have the same reference numerals for convenience.

As shown, in step 462 the method operates to perform a coarse pattern matching using a first set of sample pixel values which have a first stability neighborhood size and a corresponding first step size. Thus the method performs a first iteration of pattern matching using the first set of sample pixel values and the first step size. The first set of sample pixels used for the initial coarse pattern matching preferably have the largest stability neighborhood size and hence the largest step size. This coarse pattern searching produces zero or more possible locations for the template image in the target image. In other words, this coarse pattern searching produces zero or more candidate locations in the target image which possibly include the template image.

After step 462, in step 464 the method operates to perform a finer pattern matching at these possible locations or candidate locations using a second set of sample pixel values which have a second stability neighborhood size and a corresponding second step size, wherein the second stability neighborhood size and the second step size are smaller than the first stability neighborhood size and first step size. This finer pattern searching produces zero or more possible locations for the template image in the target image, and typically involves discarding one or more false matches produced in the coarse search performed in step 462.

Step 464 may be repeated one or more times to perform even finer pattern matching using other sets of sample pixel values which have even smaller stability neighborhood sizes and corresponding second step sizes. Step 464 is preferably repeated at the remaining candidate locations. After one or more iterations of step 464, the method may involve performing a final pattern matching in step 464 using all of the sample pixel values to determine if any remaining possible matches are actual matches. Alternatively, after one or more iterations of step 464 and/or after a pattern matching step using all of the sample pixel values, in step 466 the method further optionally performs a pattern matching using all of the template pixels for the remaining candidate locations in the target image. The number of iterations that are performed in step 464 depends on the degree of desired preciseness in the pattern matching. In a similar manner, the decision whether step 466 is performed also depends on the degree of desired preciseness in the pattern matching.

Thus the pattern matching comprises performing a plurality of iterations of pattern matching using different ones of the sets of sample pixels, preferably with different step sizes. Where the local stability analysis determines a plurality of sets of sample pixels with differing stability neighborhood sizes, the pattern matching comprises performing a plurality of iterations of pattern matching using different ones of said sets of sample pixels in a coarse to fine manner, e.g., with successively smaller stability neighborhood sizes and/or successively smaller step sizes. If a first iteration of pattern matching determines one or more candidate locations in the target image which possibly include the template image, then one or more second iterations of pattern matching are performed at the determined one or more candidate locations in the target image. The first iteration of pattern matching utilizes a first stability neighborhood size and a first step size, and each of the one or more second iterations of pattern matching preferably utilize a smaller stability neighborhood size and a smaller step size.

As an example of the operation of the pattern matching performed in FIG. 7, presume the method in step 448 detects a first set of sample pixel values which have a 9×9 stability neighborhood size and a second set of sample pixel values with a 5×5 stability neighborhood size, etc. When performing the pattern matching search in step 462, the method preferably starts using the sample pixel values which have the larger stability neighborhood size, e.g., the 9×9 stability neighborhood size. This search also uses a step size corresponding to this stability neighborhood size, e.g., a step size of 9 pixels. Thus, because these points or sample pixel values are stable over a 9×9 region, the search process is performed whereby, instead of visiting each pixel in the target image to compute the match values, the pattern matching is preferably performed at a step size of every 9 pixels.

Once this initial core search determines an initial set of possible matches, the second set of sample pixel values with a smaller neighborhood size, e.g., with the 5×5 stability regions, are used to perform a pattern matching at these initial match locations to perform a more refined search of these locations. This coarse to fine search based on stability neighborhood size and step size may be performed for a plurality of coarse to fine iterations until a desired degree of pattern matching has been accomplished.

Figure 8:
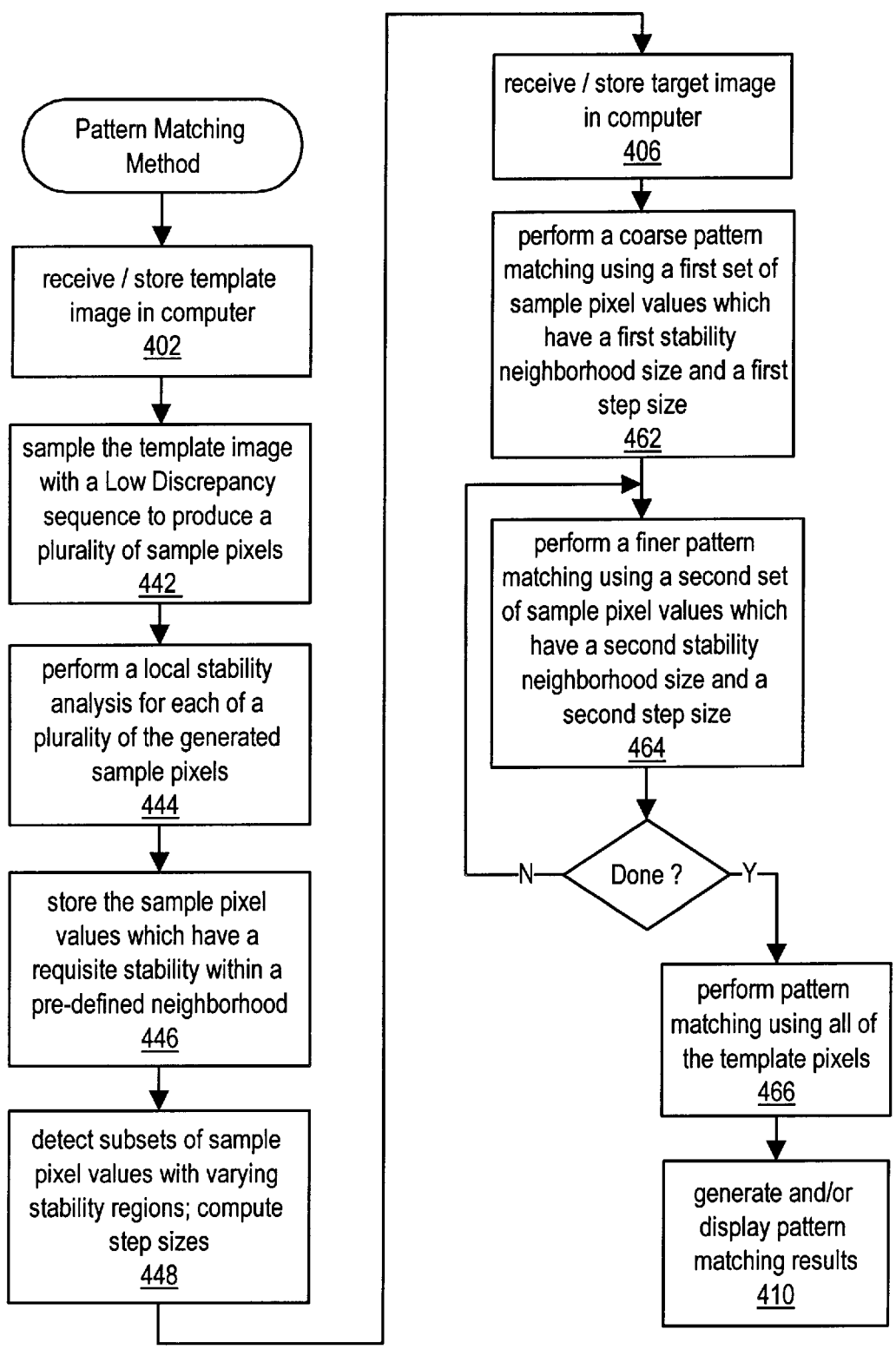
FIG. 8 is a flowchart diagram illustrating the pattern matching method of the preferred embodiment, incorporating the flowcharts of FIGS. 5–7.

FIG. 8—Pattern Matching Method of the Preferred Embodiment

FIG. 8 illustrates the pattern matching method of the preferred embodiment. FIG. 8 comprises the combination of FIGS. 5, 6 and 7 displayed in a single flowchart.

FIGS. 9*a*–9*f*: Comparing the Template Image with Every Possible Portion of the Target Image FIGS. 9*a*–9*f* illustrate a prior art pattern matching technique wherein the template image or sample pixels representing the template image are compared against every possible portion of the target image. In FIGS. 9*a*–9*f*, the shaded block represents the template image or the sample pixels representing the template image.

Figure 9A:
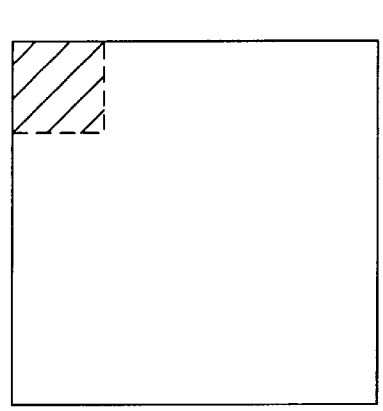
FIGS. 9a–9f illustrate pattern matching without a step size according to the prior art.
Figure 9B:
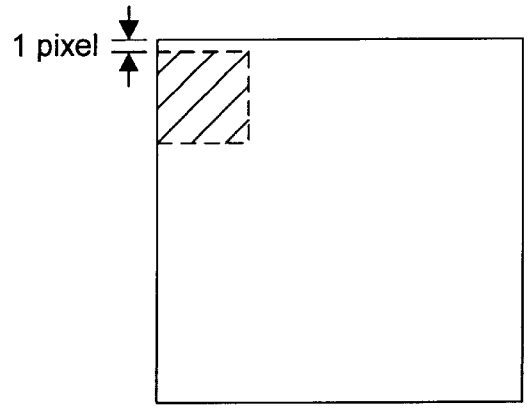
Figure 9C:
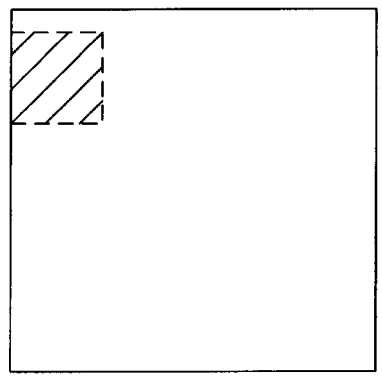
Figure 9D:
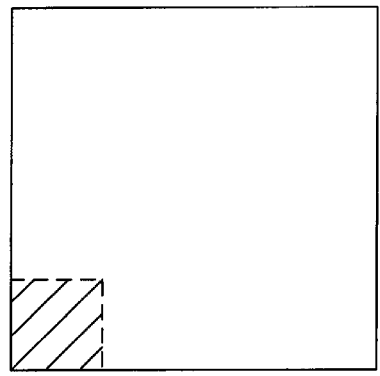
Figure 9E:
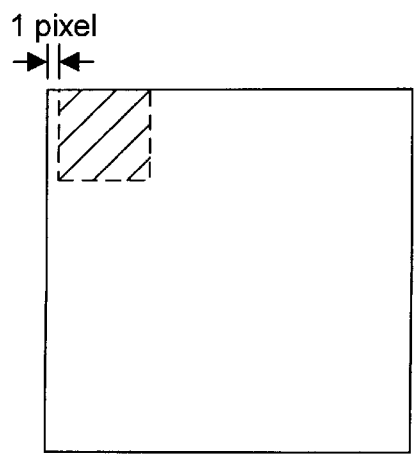
Figure 9F:
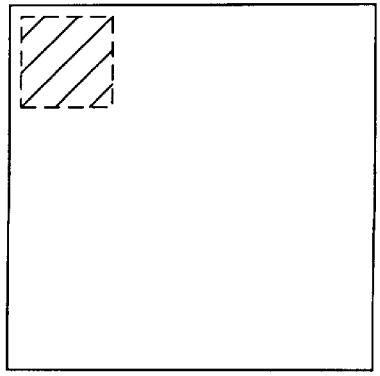

As shown in FIGS. 9*a*–9*f*, in a prior art pattern matching techniques the template image is compared with each possible portion of the target image. Thus, for example, in FIG. 9*a* the template image is compared with a corresponding portion of the target image at the upper left portion of the target image. After this comparison has been performed, the template image is moved down one scan line of pixels as shown in FIG. 9*b* and compared with the next perspective portion of the target image. After this comparison, the template image is moved down again one pixel scan line as shown in FIG. 9*c* and is compared with another portion of the target image. This is repeated a plurality of times until the template image reaches the very bottom left portion of the target image as shown in FIG. 9*d*. After the template image is compared with the bottom left portion of the target image as shown in FIG. 9*d*, the template image, for example, is moved back to the very top of the target image and moved across one vertical column of pixels to begin a new set of comparisons as shown in FIG. 9*e*. After this comparison is performed in FIG. 9*e*, the template image is moved down one horizontal scan line of pixels and compared with the next respective portion of the target image as shown in FIG. 9*f*. This operation again repeats a plurality of times until the template image again reaches the bottom of the target image. At this point, the template image is moved back to the top of the target image and across one more vertical column of pixels (not shown) to perform another set of comparisons. The comparisons repeat until the template image has been compared with every possible corresponding portion of the target image. As can be readily seen, this results in a large amount of computations. It is also noted that the template image may be moved in various manners across the target image, such as horizontally, vertically, or combinations thereof.

Figure 10A:
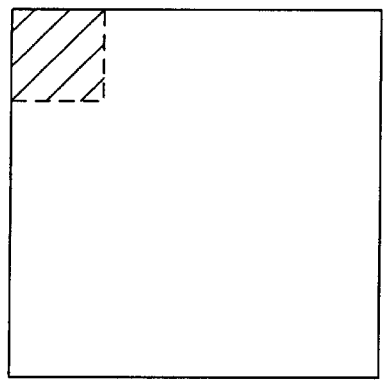
FIGS. 10a–10f illustrate pattern matching using a 9×9 step size based on local stability analysis performed according to the present invention.
Figure 10B:
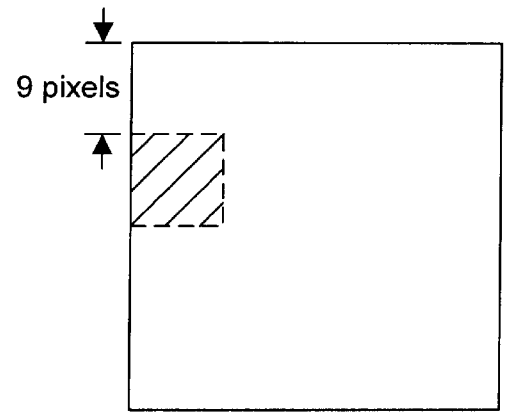
Figure 10C:
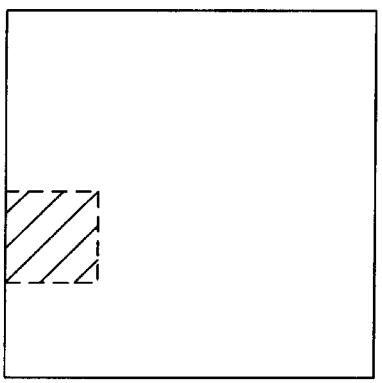
Figure 10D:
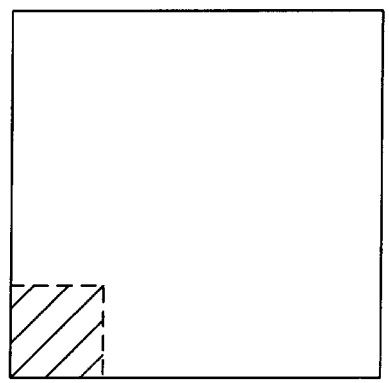
Figure 10E:
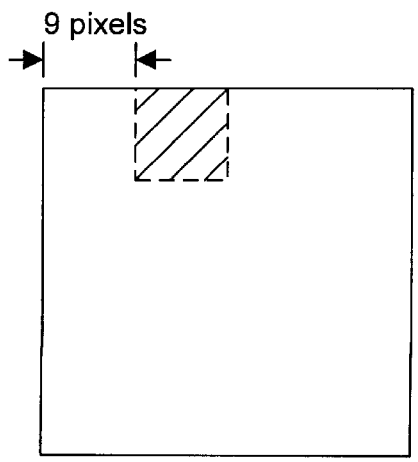
Figure 10F:
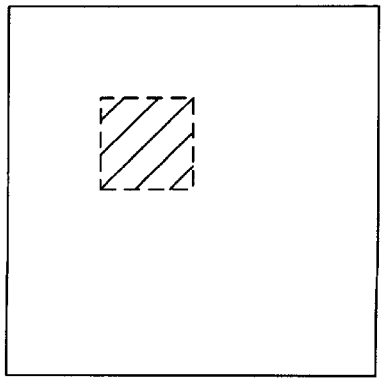
Figure 11A:
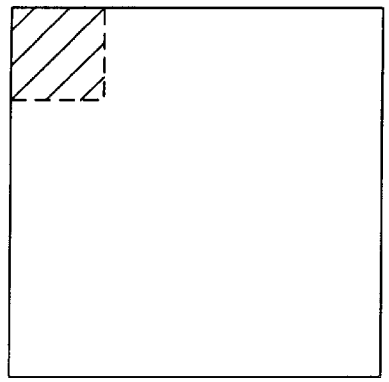
FIGS. 11a–11f illustrate pattern matching using a 5×5 step size based on local stability analysis performed according to the present invention.
Figure 11B:
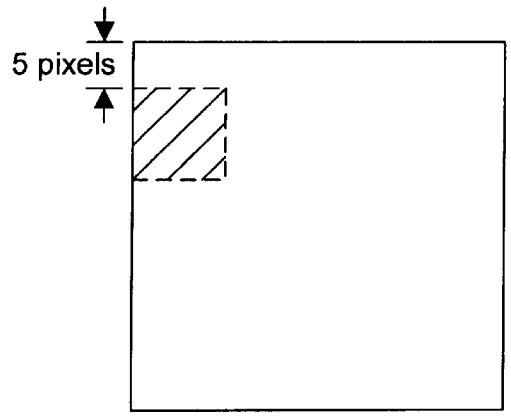
Figure 11C:
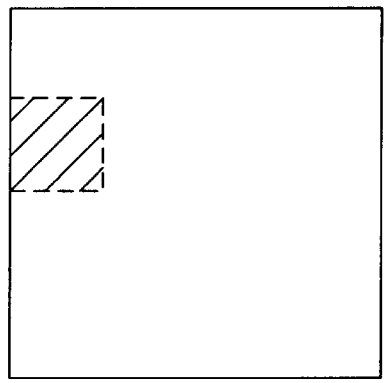
Figure 11D:
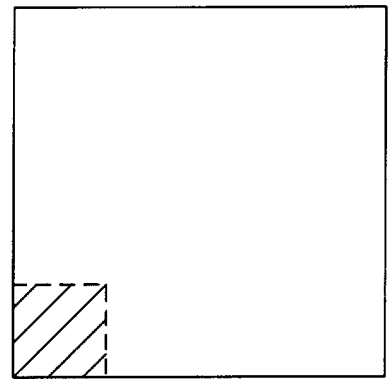
Figure 11E:
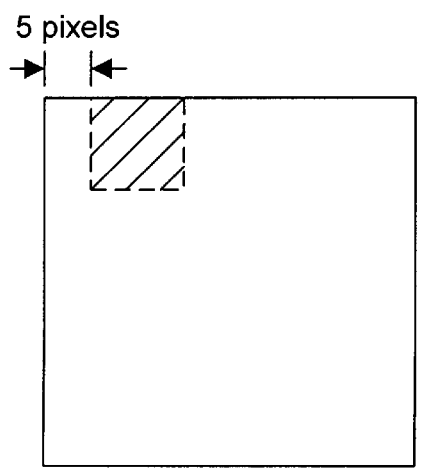
Figure 11F:
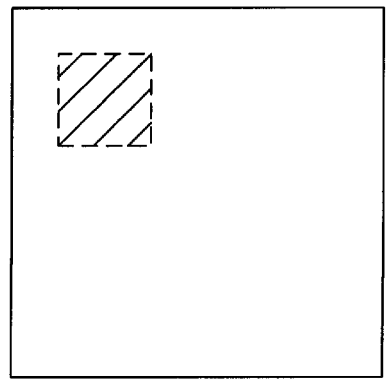

FIGS. 10*a*–10*f*: Comparing the Template Image with the Target Image Using a 9 Pixel Step Size FIGS. 10*a*–10*f* illustrate the pattern matching performed using a step size of 9 pixels from the example above. As shown, for the coarse search using a step size of 9 pixels, the template image is stepped across respective portions of the target image with a 9 pixel step size instead of a 1 pixel step size. In other words, as shown in FIG. 10*a*, the template image, or the sample pixels representing the template image, are initially compared with a corresponding portion of the target image, such as the upper left corner of the target image. After this comparison has been performed in FIG. 10*a*, the template image, for example, is moved downward 9 pixel scan lines as shown in FIG. 10*b* and is compared with the next respective portion of the target image. After this comparison has been performed in FIG. 10*b*, the template image is moved another 9 scan lines downward as shown in FIG. 10*c*, and the sample pixels are again compared with the respective portion of the target image. The comparisons are repeated until the template image reaches the bottom left portion of the target image, as shown in FIG. 10*d*. After this comparison, the template image, for example, is moved back to the top of the target image and is moved over 9 vertical pixel columns to perform another comparison, as shown in FIG. 10*e*. After this comparison is performed in FIG. 10*e*, the template image is moved down 9 horizontal scan lines of pixels and compared with the next respective portion of the target image as shown in FIG. 10*f*. This operation again repeats a plurality of times until the template image again reaches the bottom of the target image. At this point, the template image is moved back to the top of the target image and across 9 more vertical column of pixels (not shown) to perform another set of comparisons. This operation is performed until the template image has been stepped across the entire target image, using a 9 pixel step size. It is noted that FIGS. 10A–10*f* are merely an example of stepping the template image across the target image, it being noted that the template image may be stepped across the target image in any of various manners, i.e., left to right, right to left, top to bottom, bottom to top, or other methodologies.

FIGS. 11*a*–11*f*: Comparing the Template Image with the Target Image Using a 5 Pixel Step Size FIGS. 11*a*–11*f* illustrate the pattern matching performed using a step size of 5 pixels from the example above. As shown, for the finer search using a step size of 5 pixels, the template image is stepped across respective portions of the target image with a 5 pixel step size. In the preferred embodiment, the finer search is only performed at locations which are indicated to be possible matches in the initial coarse search.

Thus, FIGS. 10a–10f illustrate performance of a pattern matching using a first set of sample pixel values with a larger stability neighborhood. FIGS. 11a–11f illustrate the pattern matching algorithm using a second set of sample pixel values with a smaller stability neighborhood size and smaller step size, preferably performed at possible match locations indicated by the first pattern matching step. As discussed above with respect to step 464, this finer search may be repeated zero or more times, each iteration preferably with a smaller step size and a greater number of samples, until a desired degree of precision has been obtained. A final pattern matching iteration may involve using all pixels in the template image at the one or more locations in the target image which are possible matches.

It is noted that performing pattern matching using a step size is a prior art technique. However, prior art methods generally use the same sample pixels or template image regardless of step size.

Therefore, in the preferred embodiment of the present invention, the method operates to select a subset of sample pixels for a respective pattern matching comparison based on a local stability analysis. The method of the present invention also operates to compute a step size based on a determined stability region or neighborhood of the respective sample pixels. The method further operates to use different subsets of sample pixels and different corresponding step sizes in a coarse to fine analysis.

Figure 12:
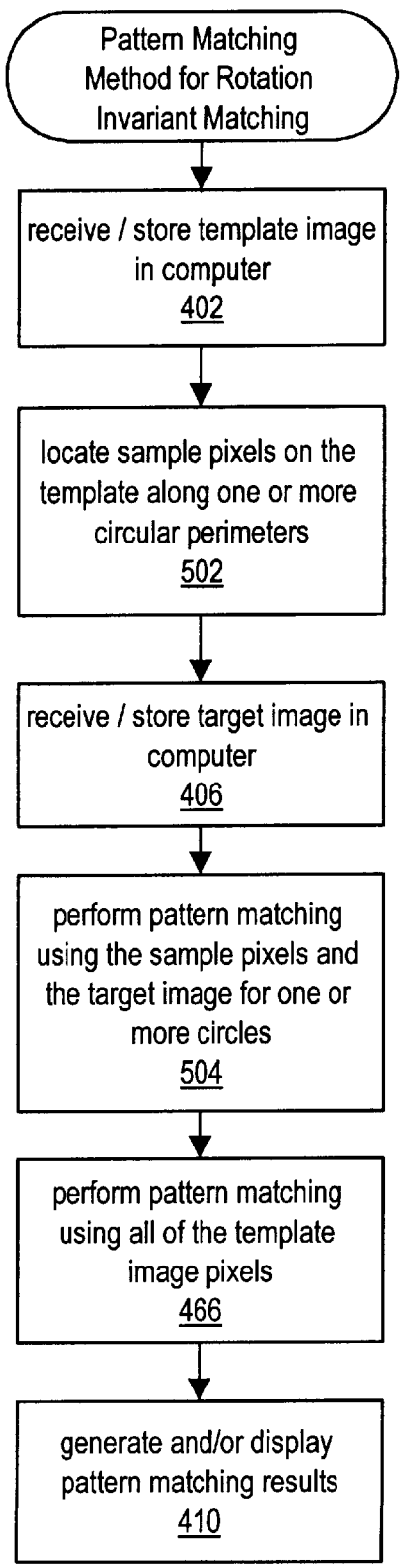
FIG. 12 is a flowchart diagram illustrating the pattern matching method for rotation invariant matching according to the present invention.

FIG. 12—Rotation Invariant Pattern Matching

FIG. 12 is a flowchart diagram illustrating a method for performing rotation invariant pattern matching. The method of FIG. 12 includes characterizing or representing the template image for rotation invariant matching. Thus, in FIG. 12 the objective is to efficiently sample the image to find a reduced set of sample pixel values or points that characterize the template accurately, and which are also conducive for finding the template image in the target image irrespective of the orientation of the template image in the target image. Steps in FIG. 12 which are similar or identical to previously discussed steps have the same reference numerals for convenience.

As shown in FIG. 12, in step 402 the method receives/stores the template image.

In step 502 the method operates to sample or locate pixel values in the template image along one or more rotationally invariant paths, e.g., the circular perimeter of one or more circles. This essentially operates to sample the image in a manner which is rotationally invariant, i.e., locate pixels in the template image along one or more circular perimeters or circular paths.

After step 502, in step 406 the target image is received and/or stored in the computer system.

After the target image is received and/or stored in step 406, in step 504 the method performs pattern matching using the circular perimeter sample pixels and the target image. The pattern matching may be performed for each of the one or more circles located in the template image. This rotation invariant pattern matching preferably uses a cyclic correlation. The cyclic correlation method first correlates the two signals, i.e., the samples pixels taken from the circular path and the respective pixels in the target image, to determine a correlation value. After this first correlation, the method shifts one signal, e.g., the sample pixels, with respect to the other signal by one sample pixel and again performs a correlation. This process is repeated, preferably until all possible correlations have been performed, i.e., until the sample pixels have been shifted back to their original location. After each of these correlations has been performed, the method determines the location and/or rotation of maximum correlation. This provides information (good estimations) on the location and rotation of the template image in the target image.

The pattern matching performed in step 504 may also be used to search for changes in size of the template image in the target image. In other words, the pattern matching performed in step 504 may also be used to search for scaled versions (larger or smaller) of the template image. This is accomplished by scaling (increasing or decreasing) the size of the search circles. More particularly, for scale invariant matching, the method uses sample pixels from a respective circular perimeter from the template (e.g., of radius "R"). During the pattern matching, the method changes the radius of the search circle. The method increases the radius R when searching for patterns that are bigger than the template image and decreases the radius R when searching for patterns in the image that are smaller than the template image.

Figure 13:
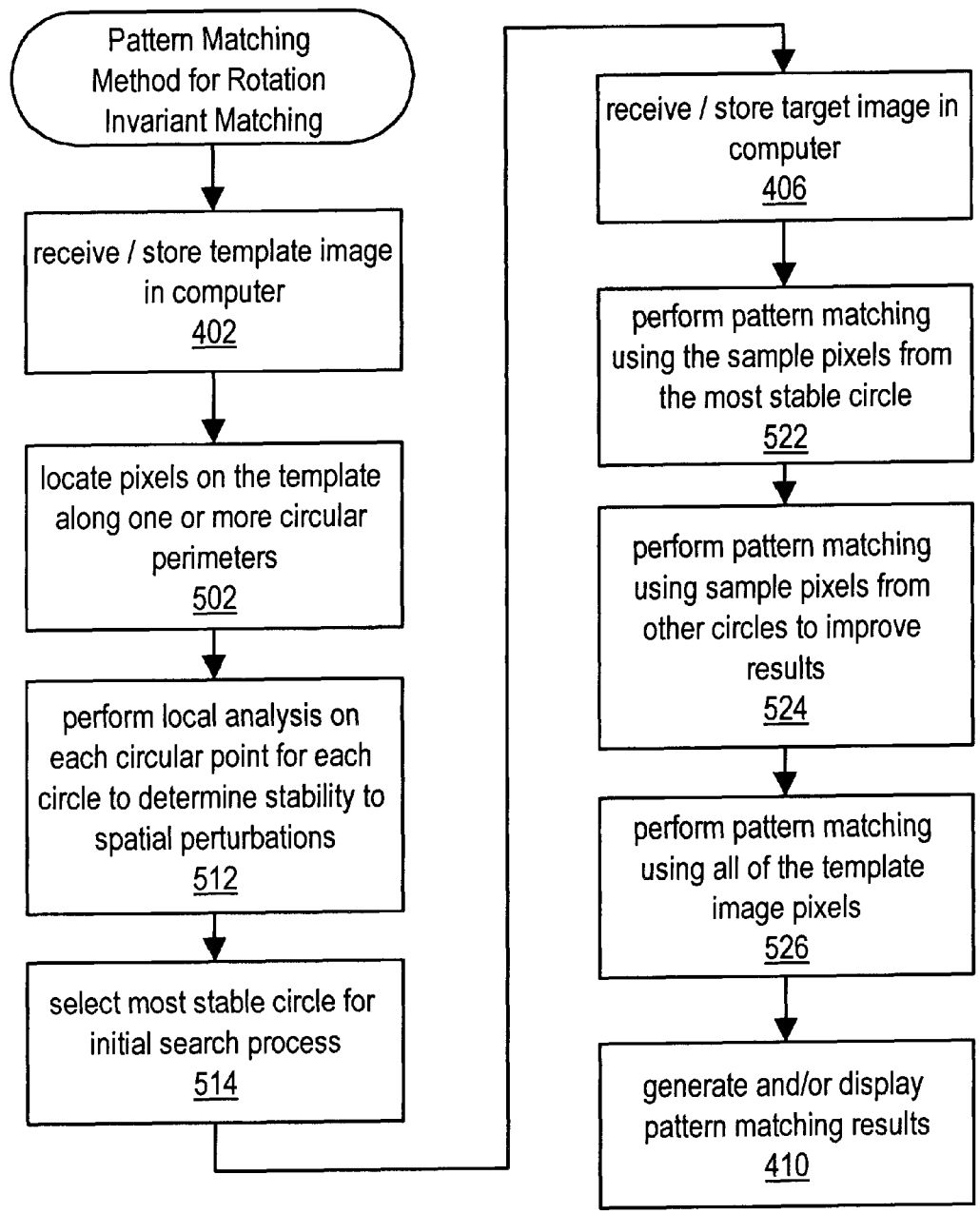
FIG. 13 is a flowchart diagram illustrating the pattern matching method for rotation invariant matching according to the preferred embodiment of the present invention.

FIG. 13—Rotation Invariant Pattern Matching Including a Coarse to Fine Search

FIG. 13 is a flowchart diagram illustrating a method for performing rotation invariant pattern matching using a coarse to fine search procedure.

In step 402 the method receives/stores the template image.

In step 502 the method operates to locate pixel values in the template image along one or more rotationally invariant paths, e.g., along a circular perimeter of one or more circles. This essentially operates to sample the image in a manner which is rotationally invariant, i.e., locate sample pixels in the template image along one or more circular perimeters or circular paths.

In step 512 the method optionally performs a local stability analysis on the sample pixel values from each circular path to determine respective stability with respect to spatial perturbations. For each sample pixel, the local stability analysis comprises finding a neighborhood around the sample pixel where the value of the sample pixel correlates highly with the template image pixel values in the neighborhood. In step 512 the method determines the stability region or neighborhood size for the sample pixels of each of the respective circles. The method also preferably computes a step size for each of the circles. The local stability analysis thus determines a plurality of sets of sample pixels with differing stability neighborhood sizes.

In step 514 the method selects the sample pixels of the most stable circle for the initial search process. Alternatively, the method selects an ordering of sample pixels from at least a subset of the circles, preferably from most stable to least stable, for use in the coarse to fine search.

After step 514, in step 406 the target image is received and/or stored in the computer system.

After the target image is received and/or stored in step 406, in step 522 the method performs pattern matching using the sample pixels from one or more of the most stable circles. The method preferably compares the sample pixels with a plurality of portions of the target images, optionally using the computed step size to step the sample pixels across the target image. The pattern matching performed in step 522 preferably determines zero or more candidate locations where a rotated version of the template image may be located. This pattern matching also preferably determines a rotation value indicating the possible rotation of the template image in the target image based on the maximum correlation value obtained in the cyclic correlation.

After step 522, in step 524 the method performs pattern matching using sample pixels from one or more other circles to improve results. In the preferred embodiment, the method performs a coarse to fine search, wherein in step 522 the method determines one or more candidate locations and corresponding rotation values where the template image may be located. In step 524 the method performs pattern matching using sample pixels from one or more other less stable circles at these candidate locations and preferably using these rotation values. Thus, the method performs a coarse to fine search process as described above, wherein sample pixel values for the most stable circular path are first used in an initial search process, and then sample pixel values from additional circles are used at possible match locations to improve the initial search results and accurately determine the template's position and rotation in the image.

Figure 14A:
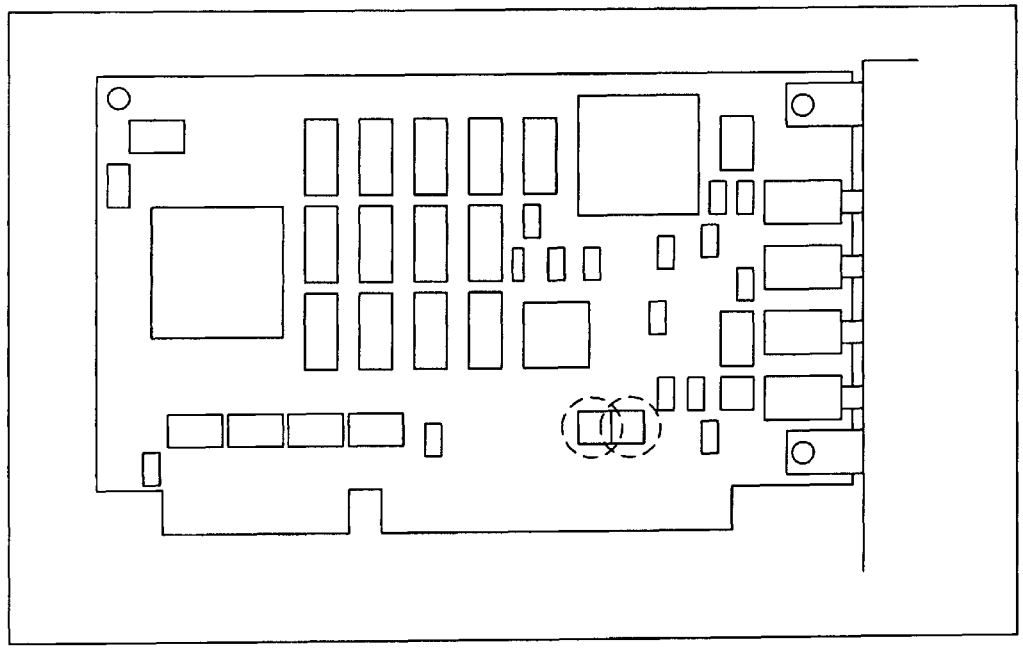
FIGS. 14A,14B and 15 illustrate the rotation invariant pattern matching method.
Figure 14B:
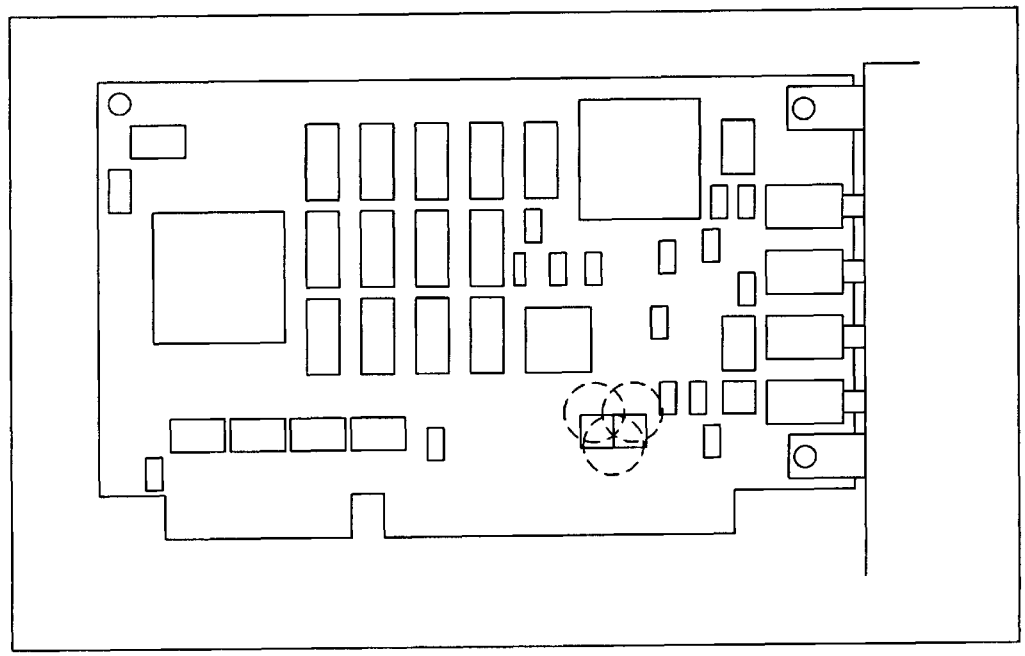
Figure 15:
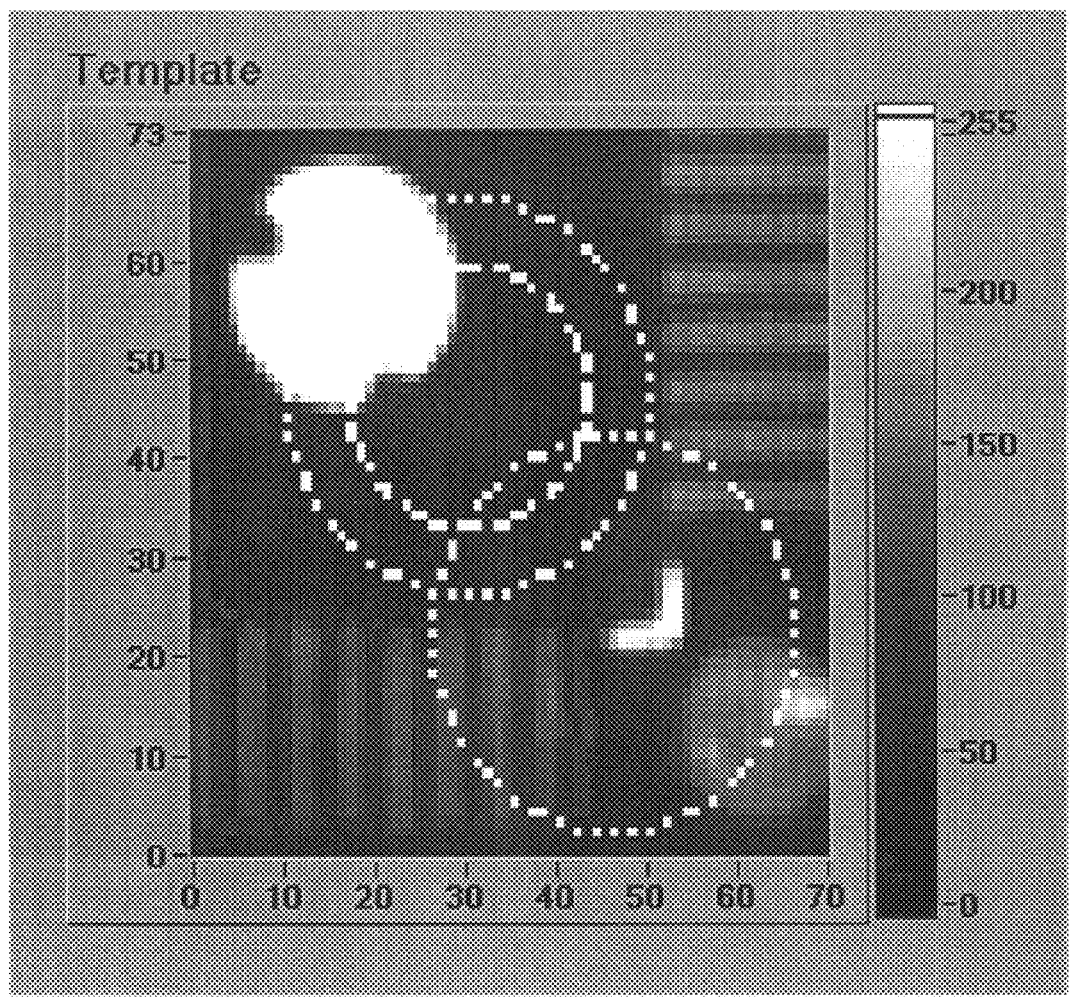

In the preferred embodiment, the rotation invariant pattern matching method utilizes non-overlapping circular paths in the image. Also, in the preferred embodiment the method uses multiple circles to reject false matches. The method also may use concentric circles, as desired. FIGS. 14A and 14B illustrate the characterization of the template image (a printed circuit board) for rotation invariant matching using sample pixels taken from one or more circular paths. FIG. 14A shows the use of sample pixels from concentric circles, and FIG. 14B shows the use of non-concentric, non-overlapping circles. FIGS. 14A and 14B also show an example template image which is desired to be found in the target iamge. FIG. 15 is an actual screen shot illustrating the use of concentric and non-concentric circles.

After step 524, in step 526 the method optionally performs a pattern matching using all of the template image pixels, preferably using a rotation value determined in either of steps 522 or 524 to rotate the template image pixels prior to the pattern matching. In other words, the template image is rotated to approximately match the orientation of the candidate template image in the target image, and then the pattern matching is performed using all of the template image pixels. This rotation of the template image prior to the pattern matching is necessary since the entire template image is not rotationally invariant.

After the pattern matching performed in steps 522, 524 and/or 526, then method then generates the results in step 410. In this case, the results include the location of zero or more template image instances in the target image, as well as the rotation or orientation of each instance.

The pattern matching performed in step 504 and/or the methods described in FIGS. 12 and 13 may also be used to search for changes in size of the template image in the target image. In other words, the pattern matching performed in step 504 may also be used to search for scaled versions (larger or smaller) of the template image. This is accomplished by scaling (increasing or decreasing) the size of the search circles. More particularly, for scale invariant matching, the method uses sample pixels from a respective circular perimeter from the template (e.g., a circle of radius "R"). During the pattern matching, the method changes the radius of the search circle. The method increases the radius R when searching for patterns that are bigger than the template image and decreases the radius R when searching for patterns in the image that are smaller than the template image.

Figure 16:
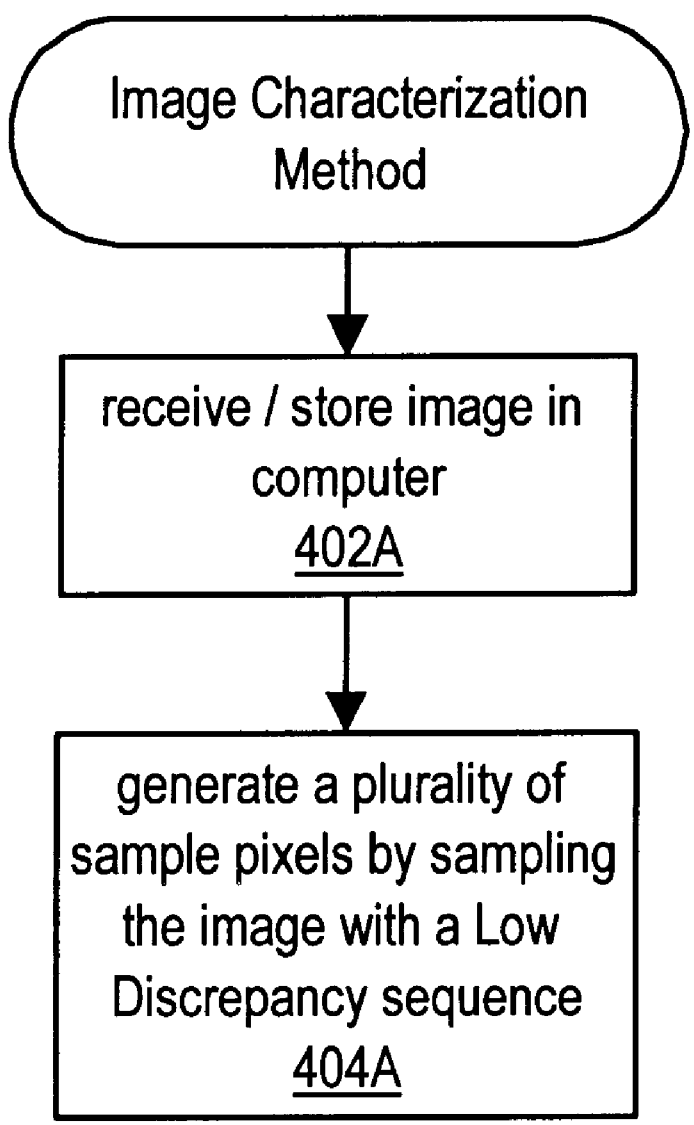
FIG. 16 illustrates an image characterization method using a Low Discrepancy sequence.

FIG. 16—Characterization of an Image for General Applications

FIG. 16 is a flowchart diagram illustrating a system and method for representing an image with a reduced number of pixel values according to the present invention. Thus, FIG. 16 illustrates a generalized method for representing an image with a reduced set of points or pixels. This method may be used to represent a template image in a pattern matching application. However, the general method shown in FIG. 16 may be used to represent an image for any of various different types of applications including those other than pattern matching, such as image compression, video compression, image archival, other applications.

As shown, in step 402A the image is received by or stored in the computer system. The image may be received from any of various sources, as desired. The image preferably comprises a first plurality of pixels.

In step 404A the image is characterized or sampled to represent the image with the lesser number of pixels or samples which accurately characterize the image. According to the preferred embodiment of the invention, the pixels comprising the image are sampled using a Low Discrepancy sequence as described above with respect to step 404 of FIG. 5.

Although the, system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for performing pattern matching to locate one or more instances of a template image in a target image, wherein the template image comprises a first plurality of pixels, the method comprising:

sampling the template image to produce a second plurality of sample pixels, wherein said second plurality of sample pixels is less than the first plurality of pixels in the template image;

performing a local stability analysis around at least a subset of said sample pixels, wherein said performing said local stability analysis determines a third plurality of sample pixels which have a desired degree of stability, wherein said third number is less than said second number;

performing pattern matching using the third plurality of sample pixels and the target image to determine zero or more locations of the template image in the target image.

2. The method of claim 1, wherein said performing the local stability analysis operates to ensure stability of each of said subset of sample pixels to spatial perturbations around the sample pixel.

3. The method of claim 1, wherein said performing the local stability analysis for each of said at least a subset of said sample pixels comprises:

for each sample pixel, finding a neighborhood around the sample pixel where the value of the sample pixel correlates highly with the template image pixel values in the neighborhood.

4. The method of claim 1, wherein said performing the local stability analysis determines a plurality of sets of sample pixels with differing stability neighborhood sizes;

wherein said performing pattern matching comprises performing a plurality of iterations of pattern matching using different ones of said sets of sample pixels.

5. The method of claim 4, wherein said performing said plurality of iterations of pattern matching uses different step sizes for each of said different ones of said sets of sample pixels.

6. The method of claim 1, wherein said performing the local stability analysis determines a plurality of sets of sample pixels with differing stability neighborhood sizes;
wherein said performing pattern matching comprises performing a plurality of iterations of pattern matching using different ones of said sets of sample pixels in a coarse to fine manner.

7. The method of claim 6, wherein said performing said plurality of iterations of pattern matching in said coarse to fine manner uses sets of sample pixels with successively smaller stability neighborhood sizes.

8. The method of claim 6, wherein said performing said plurality of iterations of pattern matching in said coarse to fine manner uses sets of sample pixels with successively smaller step sizes.

9. The method of claim 6, wherein said performing said plurality of iterations of pattern matching in said coarse to fine manner uses sets of sample pixels with successively smaller stability neighborhood sizes and successively smaller step sizes.

10. The method of claim 6,
wherein a first iteration of pattern matching determines one or more candidate locations in the target image which possibly include the template image; and
wherein one or more second iterations of pattern matching are performed at said determined one or more candidate locations in the target image.

11. The method of claim 6, wherein said first iteration of pattern matching utilizes a first stability neighborhood size;
wherein each of said one or more second iterations of pattern matching utilize a smaller stability neighborhood size than said first stability neighborhood size.

12. The method of claim 11, wherein said first iteration of pattern matching utilizes a first step size;
wherein each of said one or more second iterations of pattern matching utilize a smaller step size than said first step size.

13. The method of claim 1, wherein said performing the local stability analysis determines a first set of sample pixels with a first stability neighborhood size and a second set of sample pixels with a second stability neighborhood size, wherein the first stability neighborhood size is greater than the second stability neighborhood size;
wherein said performing pattern matching comprises:
performing a first iteration of pattern matching using the first set of sample pixels having the first stability neighborhood size;
wherein said first iteration of pattern matching determines one or more candidate locations in the target image which possibly include the template image; and
performing a second iteration of pattern matching using the second set of sample pixels having the second stability neighborhood size at said determined one or more candidate locations in the target image.

14. The method of claim 13, wherein said performing the pattern matching utilizing the first stability neighborhood size includes using a first step size, and wherein the performing pattern matching using the second stability neighborhood size utilizes a second step size, wherein said first step size is greater than said second step size.

15. The method of claim 14, wherein said performing the local stability analysis includes determining said first step size and said second step size.

16. The method of claim 14, wherein said first step size corresponds to said first stability neighborhood size and wherein said second step size corresponds to said second stability neighborhood size.

17. The method of claim 1, wherein said local stability analysis is performed for all of said sample pixels.

18. The method of claim 1, wherein said sampling the template image uses a low discrepancy sequence, wherein the low discrepancy sequence is designed to produce sample points which maximally avoid each other.

19. The method of claim 1, further comprising:
receiving the target image after said sampling the template image, wherein said performing pattern matching is performed in response to receiving the target image, wherein said pattern matching is performed substantially in real time after receiving the target image.

20. A method for performing pattern matching to locate one or more instances of a template image in a target image, wherein the template image comprises a first plurality of pixels, the method comprising:
sampling the template image to produce a second plurality of sample pixels, wherein said second plurality of sample pixels is less than the first plurality of pixels in the template image;
performing a local stability analysis around at least a subset of said sample pixels, wherein said performing said local stability analysis determines a plurality of sets of sample pixels with differing stability neighborhood sizes;
performing pattern matching using the sample pixels and the target image to determine zero or more locations of the template image in the target image, wherein said performing pattern matching comprises performing a plurality of iterations of pattern matching using different ones of said sets of sample pixels.

21. The method of claim 20, wherein said performing said plurality of iterations of pattern matching uses different step sizes for each of said different ones of said sets of sample pixels.

22. The method of claim 20, wherein said performing said plurality of iterations of pattern matching uses different ones of said sets of sample pixels in a coarse to fine manner.

23. The method of claim 22, wherein said performing said plurality of iterations of pattern matching in said coarse to fine manner uses sets of sample pixels with successively smaller stability neighborhood sizes.

24. The method of claim 22, wherein said performing said plurality of iterations of pattern matching in said coarse to fine manner uses sets of sample pixels with successively smaller step sizes.

25. The method of claim 22, wherein said performing said plurality of iterations of pattern matching in said coarse to fine manner uses sets of sample pixels with successively smaller stability neighborhood sizes and successively smaller step sizes.

26. The method of claim 22,
wherein a first iteration of pattern matching determines one or more candidate locations in the target image which possibly include the template image; and
wherein one or more second iterations of pattern matching are performed at said determined one or more candidate locations in the target image.

27. The method of claim 22, wherein said first iteration of pattern matching utilizes a first stability neighborhood size;
wherein each of said one or more second iterations of pattern matching utilize a smaller stability neighborhood size than said first stability neighborhood size.

28. The method of claim 27, wherein said first iteration of pattern matching utilizes a first step size;
wherein each of said one or more second iterations of pattern matching utilize a smaller step size than said first step size.

29. The method of claim 20, wherein said performing the local stability analysis determines a first set of sample pixels with a first stability neighborhood size and a second set of sample pixels with a second stability neighborhood size, wherein the first stability neighborhood size is greater than the second stability neighborhood size;
wherein said performing pattern matching comprises:
performing a first iteration of pattern matching using the first set of sample pixels having the first stability neighborhood size;
wherein said first iteration of pattern matching determines one or more candidate locations in the target image which possibly include the template image; and
performing a second iteration of pattern matching using the second set of sample pixels having the second stability neighborhood size at said determined one or more candidate locations in the target image.

30. The method of claim 29, wherein said performing the pattern matching utilizing the first stability neighborhood size includes using a first step size, and wherein the performing pattern matching using the second stability neighborhood size utilizes a second step size, wherein said first step size is greater than said second step size.

31. The method of claim 30, wherein said first step size corresponds to said first stability neighborhood size and wherein said second step size corresponds to said second stability neighborhood size.

32. The method of claim 20, wherein said performing the local stability analysis for each of said at least a subset of said sample pixels comprises:
for each sample pixel, finding a neighborhood around the sample pixel where the value of the sample pixel correlates highly with the template image pixel values in the neighborhood.

33. The method of claim 32, wherein said performing the local stability analysis includes discarding one or more sample pixels which do not have a desired degree of stability, wherein said discarded sample pixels are not used in said pattern matching.

34. The method of claim 20,
wherein said sampling determines a second number of sample pixels, wherein said second number is less than said first number;
wherein said performing said local stability analysis determines a third plurality of sample pixels which have a desired degree of stability, wherein said third number is less than said second number;
wherein said performing pattern matching uses the third plurality of sample pixels and the target image to determine zero or more locations of the template image in the target image.

35. The method of claim 20, wherein said sampling the template image uses a low discrepancy sequence;
wherein the low discrepancy sequence is designed to produce sample points which maximally avoid each other.

36. A method for performing pattern matching to locate one or more instances of a template image in a target image the method comprising:
sampling the template image to determine a plurality of sample pixels which describe the template image;
determining stability neighborhood information for at least a subset of the sample pixels;
determining a step size based on said stability neighborhood information;
performing pattern matching by comparing at least a subset of the sample pixels representing the template image with portions of the target image, wherein said performing pattern matching uses said step size in stepping the at least a subset of the sample pixels across the target image.

37. The method of claim 36, wherein said determining stability neighborhood information determines a plurality of sets of sample pixels with differing stability neighborhood sizes;
wherein said determining said step size comprises determining a plurality of step sizes for each of said sets of sample pixels;
wherein said performing pattern matching comprises performing a plurality of iterations of pattern matching using different ones of said sets of sample pixels.

38. The method of claim 36, further comprising:
receiving the target image after said sampling the template image and after said performing the local stability analysis, wherein said performing pattern matching is performed in response to receiving the target image, wherein said pattern matching is performed substantially in real time after receiving the target image.

39. A method for performing pattern matching to locate one or more instances of a template image in a target image, wherein the template image comprises a first plurality of pixels, the method comprising:
performing a local stability analysis around at least a subset of said pixels, wherein said performing said local stability analysis determines a plurality of sets of pixels with differing stability neighborhood sizes;
performing pattern matching using the pixels and the target image to determine zero or more locations of the template image in the target image, wherein said performing pattern matching comprises performing a plurality of iterations of pattern matching using different ones of said sets of pixels.

40. The method of claim 39, wherein said performing said plurality of iterations of pattern matching uses different step sizes for each of said different ones of said sets of pixels.

41. The method of claim 39, wherein said performing said plurality of iterations of pattern matching uses different ones of said sets of pixels in a coarse to fine manner.

42. The method of claim 41, wherein said performing said plurality of iterations of pattern matching in said coarse to fine manner uses sets of pixels with one or more of: successively smaller stability neighborhood sizes or successively smaller step sizes.

43. The method of claim 41,
wherein a first iteration of pattern matching determines one or more candidate locations in the target image which possibly include the template image; and
wherein one or more second iterations of pattern matching are performed at said determined one or more candidate locations in the target image.

44. The method of claim 39, further comprising:
sampling the template image to produce a second plurality of sample pixels, wherein said second plurality of sample pixels is less than the first plurality of pixels in the template image;
wherein the local stability analysis is performed around at least a subset of said sample pixels, wherein said local stability analysis determines a plurality of sets of sample pixels with differing stability neighborhood sizes;

wherein said pattern matching uses the sample pixels and the target image to determine zero or more locations of the template image in the target image, wherein said performing pattern matching comprises performing a plurality of iterations of pattern matching using different ones of said sets of sample pixels.

45. A memory medium comprising program instructions for performing pattern matching to locate one or more instances of a template image in a target image, wherein the template image comprises a first plurality of pixels, wherein the program instructions are executable to implement:

sampling the template image to produce a second plurality of sample pixels, wherein said second plurality of sample pixels is less than the first plurality of pixels in the template image;

performing a local stability analysis around at least a subset of said sample pixels, wherein said performing said local stability analysis determines a third plurality of sample pixels which have a desired degree of stability, wherein said third number is less than said second number;

performing pattern matching using the third plurality of sample pixels and the target image to determine zero or more locations of the template image in the target image.

46. The memory medium of claim 45, wherein said performing the local stability analysis operates to ensure stability of each of said subset of sample pixels to spatial perturbations around the sample pixel.

47. The memory medium of 45, wherein said performing the local stability analysis for each of said at least a subset of said sample pixels comprises:

for each sample pixel, finding a neighborhood around the sample pixel where the value of the sample pixel correlates highly with the template image pixel values in the neighborhood.

48. The memory medium of claim 45, wherein said performing the local stability analysis determines a plurality of sets of sample pixels with differing stability neighborhood sizes;

wherein said performing pattern matching comprises performing a plurality of iterations of pattern matching using different ones of said sets of sample pixels.

49. The memory medium of claim 48, wherein said performing said plurality of iterations of pattern matching uses different step sizes for each of said different ones of said sets of sample pixels.

50. A memory medium comprising program instructions for performing pattern matching to locate one or more instances of a template image in a target image, wherein the template image comprises a first plurality of pixels, wherein the program instructions are executable to implement:

sampling the template image to produce a second plurality of sample pixels, wherein said second plurality of sample pixels is less than the first plurality of pixels in the template image;

performing a local stability analysis around at least a subset of said sample pixels, wherein said performing said local stability analysis determines a plurality of sets of sample pixels with differing stability neighborhood sizes;

performing pattern matching using the sample pixels and the target image to determine zero or more locations of the template image in the target image, wherein said performing pattern matching comprises performing a plurality of iterations of pattern matching using different ones of said sets of sample pixels.

51. The memory medium of claim 50, wherein said performing said plurality of iterations of pattern matching uses different step sizes for each of said different ones of said sets of sample pixels.

52. The memory medium of claim 50, wherein said performing said plurality of iterations of pattern matching uses different ones of said sets of sample pixels in a coarse to fine manner.

53. The memory medium of claim 52, wherein said performing said plurality of iterations of pattern matching in said coarse to fine manner uses sets of sample pixels with one or more of: successively smaller stability neighborhood sizes or successively smaller step sizes.

54. The memory medium of claim 50, wherein a first iteration of pattern matching determines one or more candidate locations in the target image which possibly include the template image; and wherein one or more second iterations of pattern matching are performed at said determined one or more candidate locations in the target image.

55. A memory medium comprising program instructions for performing pattern matching to locate one or more instances of a template image in a target image, wherein the template image comprises a first plurality of pixels, wherein the program instructions are executable to implement:

performing a local stability analysis around at least a subset of said pixels, wherein said performing said local stability analysis determines a plurality of sets of pixels with differing stability neighborhood sizes;

performing pattern matching using the pixels and the target image to determine zero or more locations of the template image in the target image, wherein said performing pattern matching comprises performing a plurality of iterations of pattern matching using different ones of said sets of pixels.

56. The memory medium of claim 55, wherein said performing said plurality of iterations of pattern matching uses different step sizes for each of said different ones of said sets of pixels.

57. The memory medium of claim 55, wherein said performing said plurality of iterations of pattern matching uses different ones of said sets of pixels in a coarse to fine manner.

58. The memory medium of claim 57, wherein said performing said plurality of iterations of pattern matching in said coarse to fine manner uses sets of pixels with one or more of: successively smaller stability neighborhood sizes or successively smaller step sizes.

59. The memory medium of claim 57, wherein a first iteration of pattern matching determines one or more candidate locations in the target image which possibly include the template image; and wherein one or more second iterations of pattern matching are performed at said determined one or more candidate locations in the target image.

60. The memory medium of claim 55, wherein the program instructions are further executable to implement:

sampling the template image to produce a second plurality of sample pixels, wherein said second plurality of sample pixels is less than the first plurality of pixels in the template image;

wherein the local stability analysis is performed around at least a subset of said sample pixels, wherein said local stability analysis determines a plurality of sets of sample pixels with differing stability neighborhood sizes;

wherein said pattern matching uses the sample pixels and the target image to determine zero or more locations of the template image in the target image, wherein said pattern matching comprises performing a plurality of iterations of pattern matching using different ones of said sets of sample pixels.

61. A system for performing pattern matching to locate one or more instances of a template image in a target image, wherein the template image comprises a first plurality of pixels, the system comprising:

a memory which stores the template image;

an input for receiving the target image;

a processor coupled to the memory which is operable to sample the template image to produce a second plurality of sample pixels, wherein said second plurality of sample pixels is less than the first plurality of pixels in the template image;

wherein the processor is operable to perform a local stability analysis around at least a subset of said sample pixels, wherein said local stability analysis determines a third plurality of sample pixels which have a desired degree of stability, wherein said third number is less than said second number;

wherein the processor is operable to perform pattern matching using the third plurality of sample pixels and the target image to determine zero or more locations of the template image in the target image.

62. A system for performing pattern matching to locate one or more instances of a template image in a target image, wherein the template image comprises a first plurality of pixels, the system comprising:

a memory which stores the template image;

an input for receiving the target image;

a processor coupled to the memory which is operable to perform a local stability analysis around at least a subset of said pixels, wherein said local stability analysis determines a plurality of sets of pixels with differing stability neighborhood sizes;

wherein the processor is operable to perform pattern matching using the pixels and the target image to determine zero or more locations of the template image in the target image, wherein said pattern matching comprises performing a plurality of iterations of pattern matching using different ones of said sets of pixels.

63. The system of claim 62, wherein, in performing said plurality of iterations of pattern matching, the processor uses different step sizes for each of said different ones of said sets of pixels.

64. The system of claim 62, wherein the processor uses different ones of said sets of pixels in a coarse to fine manner in performing said plurality of iterations of pattern matching.

65. The method of claim 64, wherein, in performing said plurality of iterations of pattern matching, the processor uses sets of pixels with one or more of: successively smaller stability neighborhood sizes or successively smaller step sizes.

* * * * *